(12) United States Patent
Eltawil et al.

(10) Patent No.: US 9,785,220 B2
(45) Date of Patent: Oct. 10, 2017

(54) COGNITIVE POWER MANAGEMENT FOR COMMUNICATION SYSTEMS

(71) Applicant: THE REGENTS OF THE UNIVERSITY OF CALIFORNIA, Oakland, CA (US)

(72) Inventors: Ahmed M. Eltawil, Irvine, CA (US); Fadi J. Kurdahi, Irvine, CA (US); Muhammad Abdelghaffar, Irvine, CA (US); Amr M. A. Hussein, Irvine, CA (US); Amin Khajeh, Hillsboro, OR (US)

(73) Assignee: THE REGENTS OF THE UNIVERSITY OF CALIFORNIA, Oakland ( * ) Notice: Subject to any disclaimer, the term of this patent is extended or adjusted under 35 U.S.C. 154(b) by 20 days.

(21) Appl. No.: 14/144,391

(22) Filed: Dec. 30, 2013

(65) Prior Publication Data
US 2014/0223208 A1 Aug. 7, 2014

Related U.S. Application Data

(60) Provisional application No. 61/747,147, filed on Dec. 28, 2012.

(51) Int. Cl.
*G06F 1/32* (2006.01)
(52) U.S. Cl.
CPC .......... *G06F 1/3275* (2013.01); *G06F 1/3225* (2013.01); *G06F 1/3296* (2013.01); *Y02B 60/1228* (2013.01); *Y02B 60/1285* (2013.01)

(58) Field of Classification Search
CPC ..... G06F 1/3275; G06F 1/3225; G06F 1/3296
See application file for complete search history.

(56) References Cited

U.S. PATENT DOCUMENTS

| | | | |
|---|---|---|---|
| 2004/0077324 A1* | 4/2004 | Wieck | 455/234.1 |
| 2010/0080311 A1* | 4/2010 | Moffatt et al. | 375/260 |
| 2010/0329395 A1* | 12/2010 | Kang et al. | 375/341 |
| 2011/0096875 A1* | 4/2011 | Amrutur et al. | 375/343 |
| 2013/0084818 A1* | 4/2013 | Croman et al. | 455/226.1 |
| 2013/0336072 A1* | 12/2013 | Wood et al. | 365/185.24 |

OTHER PUBLICATIONS

Hussein, A. M.A., et al., "A Combined Channel and Hardware Noise Resilient Viterbi Decoder", IEEE Asilomar Conference on Signals, Systems, and Computers, Pacific Grove, CA, 2010, pp. 395-399.

(Continued)

*Primary Examiner* — Thomas Lee
*Assistant Examiner* — Vincent Chang
(74) *Attorney, Agent, or Firm* — Thomas Horstemeyer, LLP; David R. Risley; Jason M. Perilla

(57) ABSTRACT

A power management technique utilizing a method for accurately and rapidly estimating the change in the statistical distribution of data at each block in a communication system leading to or originating from a memory that is experiencing voltage scaling induced errors is disclosed. An appropriate memory supply voltage that maximizes power savings is found by exploiting the available SNR slack while keeping system performance within a required margin.

21 Claims, 24 Drawing Sheets

(56) References Cited

OTHER PUBLICATIONS

Hussein, A. M.A., et al., "A Class of Low Power Error Compensation Iterative Decoders", Proceedings 2011 IEEE Global Communications Conference (GLOBECOM 2011), pp. 1-6.

Khairy, M. S., et al., "FFT Processing Through Faulty Memories in OFDM based Systems", IEEE Globecom 2010 Workshop on Application of Communication Theory to Emerging Memory Technologies, pp. 1946-1951.

Khairy, M. S., et al., "Autonomous Power Management Technique for Communication Systems", Design Automation Conference (DAC 2011), Work in Progress (WIP) Poster Session, San Diego, CA, 2011, pp. 1-6.

Khairy, M. S., et al., "Reliable Low Power Distributed Arithmetic Filters via N-modular Redundancy", IEEE Asilomar Conference on Signals, Systems, and Computers, Pacific Grove, CA, 2012, pp. 621-625.

Khairy, M. S., et al., "Error Resilient MIMO Detector for Memory-Dominated Wireless Communication Systems", Proceedings 2012 IEEE Global Communications Conference (GLOBECOM 2012), pp. 3566-3571.

Khajeh, A. et al., "A Unified Hardware and Channel Noise Model for Communication Systems", Proceedings 2010 IEEE Global Communications Conference (GLOBECOM 2010), pp. 1-5.

\* cited by examiner

COGNITIVE POWER MANAGEMENT FOR COMMUNICATION SYSTEMS

This patent application claims the benefit of priority to U.S. Provisional Application No. 61/747,147, filed Dec. 28, 2012, titled "Cognitive Power Management For Memory Dominated Wireless Communication Systems," which is hereby incorporated by reference herein in its entirety.

This invention was made with Government support under Grant No. EECS-0955157, awarded by the National Science Foundation. The Government has certain rights in this invention.

FIELD

This patent application relates in general to power management, and more specifically to an efficient power management technique that maximizes the power savings of the wireless system while satisfying the required quality of service (QoS).

BACKGROUND

Designers of next generation Systems-on-Chip (SoCs) face daunting challenges in generating high yielding architectures that integrate vast amounts of logic and memories in a minimum die size, while simultaneously minimizing power consumption. Traditional design approaches attempt to guarantee 100% error-free SoCs using a number of fault-tolerant architectural and circuit techniques. However, advanced manufacturing technologies render it economically impractical to insist on 100% error-free SoCs in terms of area and power.

Fortunately, many important application domains (e.g., communication and multimedia) are inherently error-aware, allowing a range of designs with a specified Quality of Service (QoS) to be generated for varying amounts of error in the system. However, exploitation of error-aware design to address these power, yield and cost challenges requires a significant shift from error-free to error-aware design methodologies.

In communication and multimedia systems, embedded memories are perfect candidates for this exploration, since the share of the SoC that is dedicated to memories has experienced an increasingly upwards trend exceeding more than 50% of the area of an SoC for wireless standards such as DVB, LTE and WiMAX. Furthermore, a large portion of the memory is typically used for buffering data that already has a high level of redundancy (e.g. buffering memories in wireless chips, decoded picture buffer in H.264, etc.). Finally, from a network perspective, buffering memories are transparent across a hierarchy since they do not change the nature of the data stored, which allows for simple and efficient cross-layer techniques.

Dynamic voltage frequency scaling (DVFS) techniques are the traditional techniques to perform power management where a design tradeoff is performed between power and delay where lower power is attained at the cost of larger delay, typically by running at a lower operating frequency which is set by the weakest perform in the overall system. In a majority of scenarios the culprit is embedded memories, since they exhibit the highest vulnerability to supply changes as compared to logic. For this reason, when voltage scaling is used, memories are typically treated separately to maintain the margins such that the device will meet timing 100% of the time with new settings. While this is true for some applications, such as processor memories, there exists a wide variety of applications that are error tolerant by design such as wireless and multimedia devices where the data structures are designed in such a way that there e is a redundancy inserted in the data stream to compensate for a variety of errors sources. In such systems, DVFS may not trade-off the power saving with the forgiving nature of the system.

In prior work, the authors have shown that utilizing fault tolerant techniques on embedded memories (mainly through aggressive voltage scaling) will result in a) 20%-35% power reduction in wireless systems depending on the application, b) savings in cost and area by reducing or eliminating the need for circuit redundancy, and c) achieving a higher "effective yield" by tolerating errors at the system level while keeping other parameters constant.

While the gains are lucrative, accurately evaluating the impact of hardware errors on system performance is a challenge. Typically, hardware error statistics for certain operation conditions (supply voltage, frequency) are gathered and used in a system simulation to evaluate the effectiveness and to quantify the gains of the proposed fault tolerant technique in terms of power savings and system performance impact. This approach suffers from the following major drawbacks:

Lack of scalability: Clearly the design space is very large given the numerous possible combinations of system settings and operation conditions. Since each simulation result is valid only for a specific simulation setup, therefore, for every change in the algorithm or policy, a new system simulation has to be performed, which limits the design space.

Accuracy and simulation time: The accuracy of the obtained results depends on the size of the processed data.

SUMMARY

The embodiments provided herein are directed to systems and methods utilizing a power management technique involving a method for accurately and rapidly estimating the change in the statistical distribution of data at each block in a communication system leading to or originating from a memory that is experiencing voltage scaling induced errors is disclosed. An appropriate memory supply voltage that maximizes power savings is determined by exploiting an available SNR slack while keeping system performance within the required margin.

The power management methodology of the present application leverages the use of supply voltage over-scaling (VoS) at embedded buffering memories to maximize power savings while introducing a controlled amount of errors. The power management methodology, which is based on a novel joint statistical model for both channel noise and introduced hardware errors, exploits the variable nature of the wireless channel, quality of service requested by the application (such as video and audio), as well as the hardware status (battery life and available resources), to adopt a supply voltage of the embedded buffering such that the power savings are maximized while keeping the performance within acceptable margins.

In one embodiment, based on the failure mechanism of embedded memories, a statistical model of data distribution is first derived. Then, it is propagated through the blocks of the communication chain until the slicer, or forward error correction (FEC) decoder, and bit error rate (BER) is calculated accordingly.

In another embodiment, in a system or device comprising a processor and a memory device operating at a supply voltage, the supply voltage dynamically selected from a plurality of supply voltages to achieve a target bit error rate (BER), the supply voltage is dynamically selected by estimating channel parameters, calculating an average of received signal to noise ratio ($SNR_{rec}$), based on the target bit error rate (BER), obtaining a target $SNR_{req}$, calculating available slack in the SNR, reading an equivalent effective $SNR_{eff}$ from a look up table (LUT), and selecting the supply voltage from the plurality of supply voltages, the supply voltage enabling desired power savings.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

Figure 1:
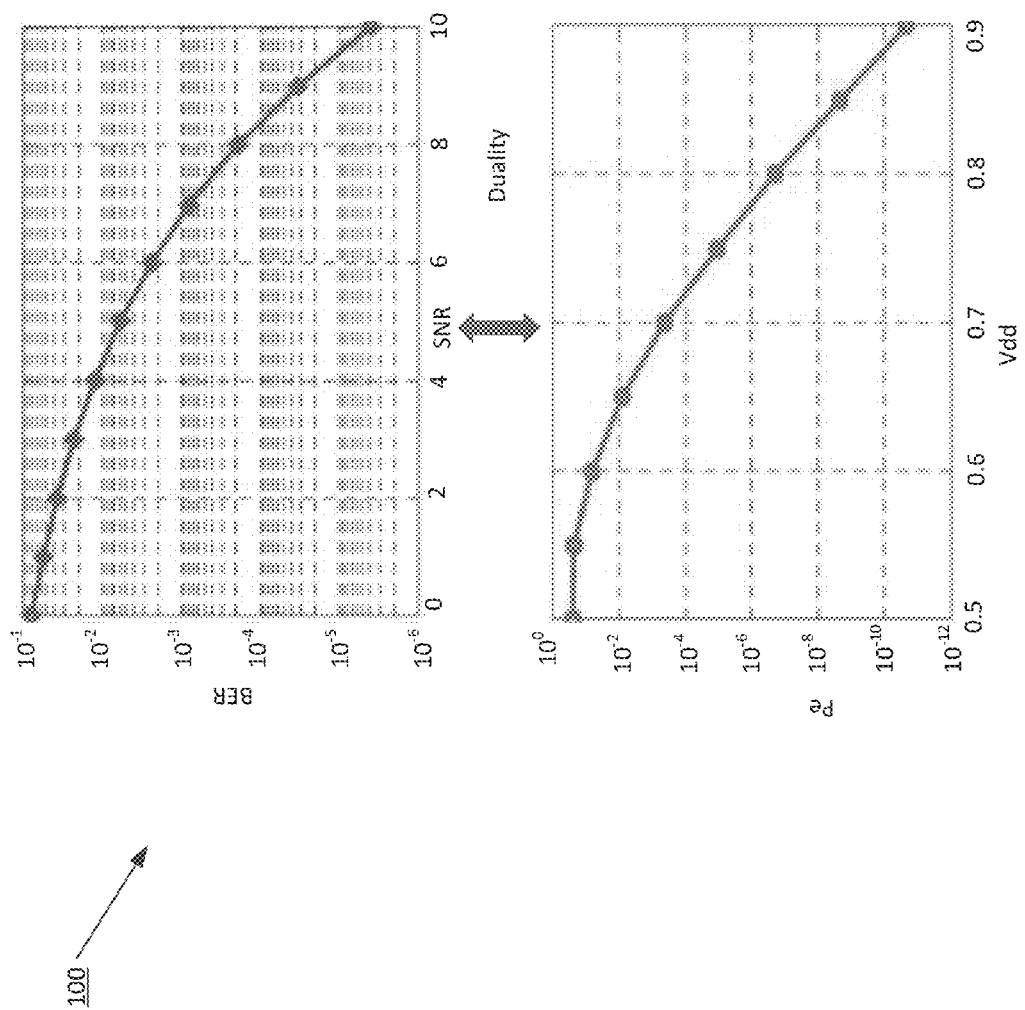
FIG. 1 is an illustration of duality between a wireless channel and an embedded memory.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

The embodiments provided herein are directed to systems and methods utilizing a power management technique involving a method for accurately and rapidly estimating the change in the statistical distribution of data at each block in a communication system leading to or originating from a memory that is experiencing voltage scaling induced errors is disclosed. An appropriate memory supply voltage that maximizes power savings is determined by exploiting an available SNR slack while keeping the system performance within the required margin.

Embodiments disclosed herein are directed to an efficient power management methodology based on a joint statistical modeling for both channel and hardware dynamics, which is referred to herein, in a non-limiting manner, as an equivalent noise technique. The methodology disclosed herein enables engineers and system designers to apply different power management parameters on embedded memories and easily trade-off the degradation in the system performance with the obtained gain in power savings. The present method is illustrated herein by considering the operation of a typical OFDM-based communication system. However, the same method can be applied to any other wireless communication system.

Embodiments disclosed herein address the challenge of accurately and rapidly estimating the change in the statistical distribution of data at each block in the communication system leading to or originating from a memory that is experiencing voltage scaling induced errors. By replacing the traditional noise model in communication systems with an equivalent noise model presented herein, one can investigate different power management parameters, where the faulty hardware can be treated as error-free hardware.

In one embodiment, in a system or device comprising a processor and a memory device operating at a supply voltage, the supply voltage dynamically selected from a plurality of supply voltages to achieve a target bit error rate (BER), the supply voltage is dynamically selected by estimating channel parameters, calculating an average of received signal to noise ratio (SNRrec), based on the target bit error rate (BER), obtaining a target SNRreq, calculating available slack in the SNR, reading an equivalent effective SNReff from a look up table (LUT), and selecting the supply voltage from the plurality of supply voltages, the supply voltage enabling desired power savings.

Turning now to the figures, FIG. 1 is an illustration 100 of duality between a wireless channel and an embedded memory. While the wireless channel is a stochastic channel where the designer has little control on its variables, one can consider embedded memories as an extension of the channel where the designer can control the quality via voltage scaling. In the case of the wireless channel, the Signal to Noise Ratio (SNR) dictates the Bit Error Rate (BER) performance. While, in the case of embedded memories, (experimental measurements for a 65 nm CMOS technology memory with nominal supply voltage of 0.9 v), the supply voltage dictates the error rate of the retrieved data. Traditional techniques attempt to guarantee virtually no error from the hardware channel by assigning a large amount of design margin, or in other words by "over designing."

As noted above, the present disclosure is directed to providing a rapid means of identifying and propagating the impact of embedded memory failures through the communication system, thus allowing the designer to opportunistically increase the noise contribution of the hardware channel based on the observed statistics of the actual communication channel to meet a certain metric of quality, such as target BER for communication devices.

Figure 2:
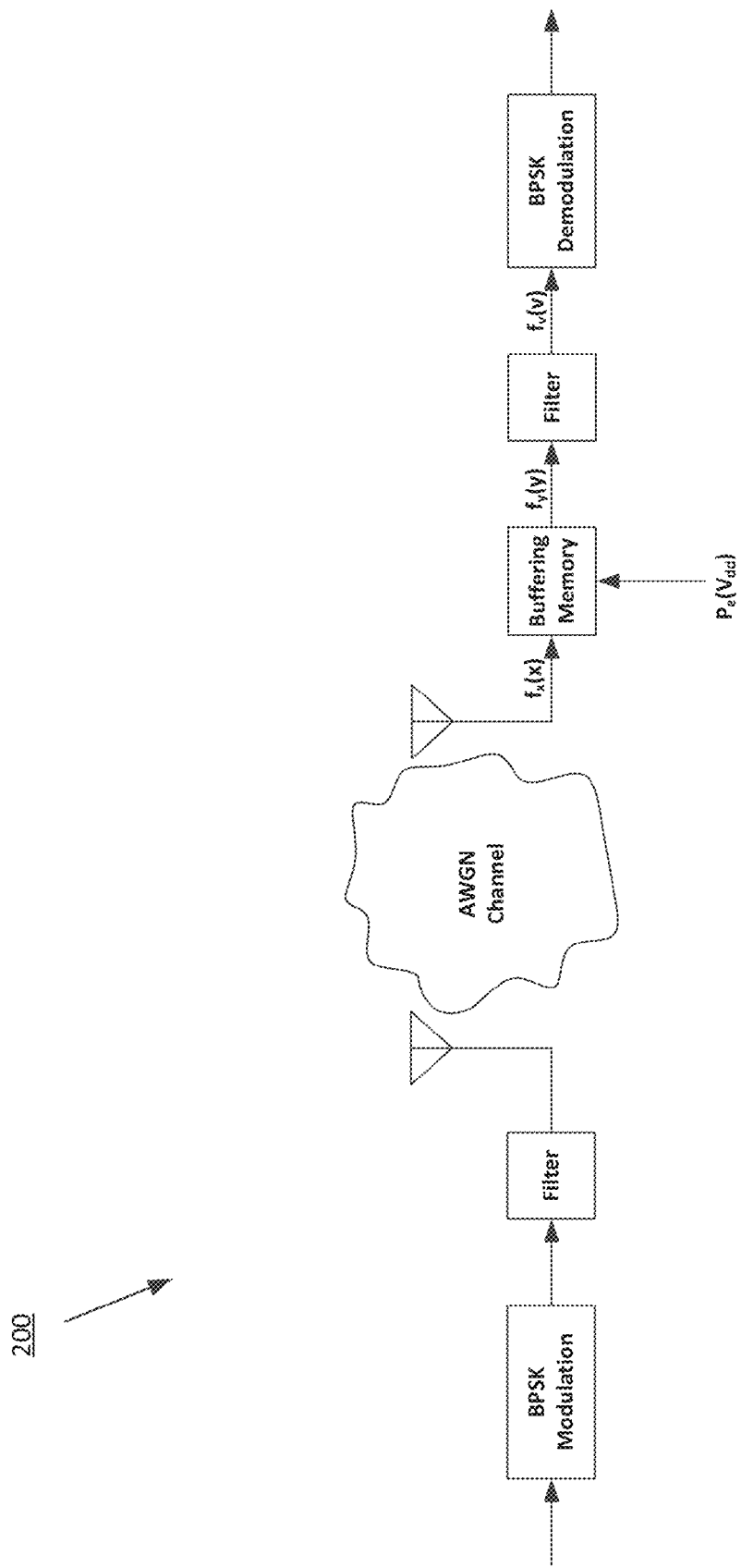
FIG. 2 is an illustration of a simplified wireless communication system model.

FIG. 2 is an illustration of a simplified wireless communication system model 200. To better illustrate the concept of hardware channel noise, a simulation for a simple communication system was set up as shown in FIG. 2. Additive White Gaussian Noise (AWGN) was assumed for the communication channel. The memory errors increase with supply voltage reduction. For simplicity, binary phase shift keying (BPSK) modulation was assumed.

Figure 3:
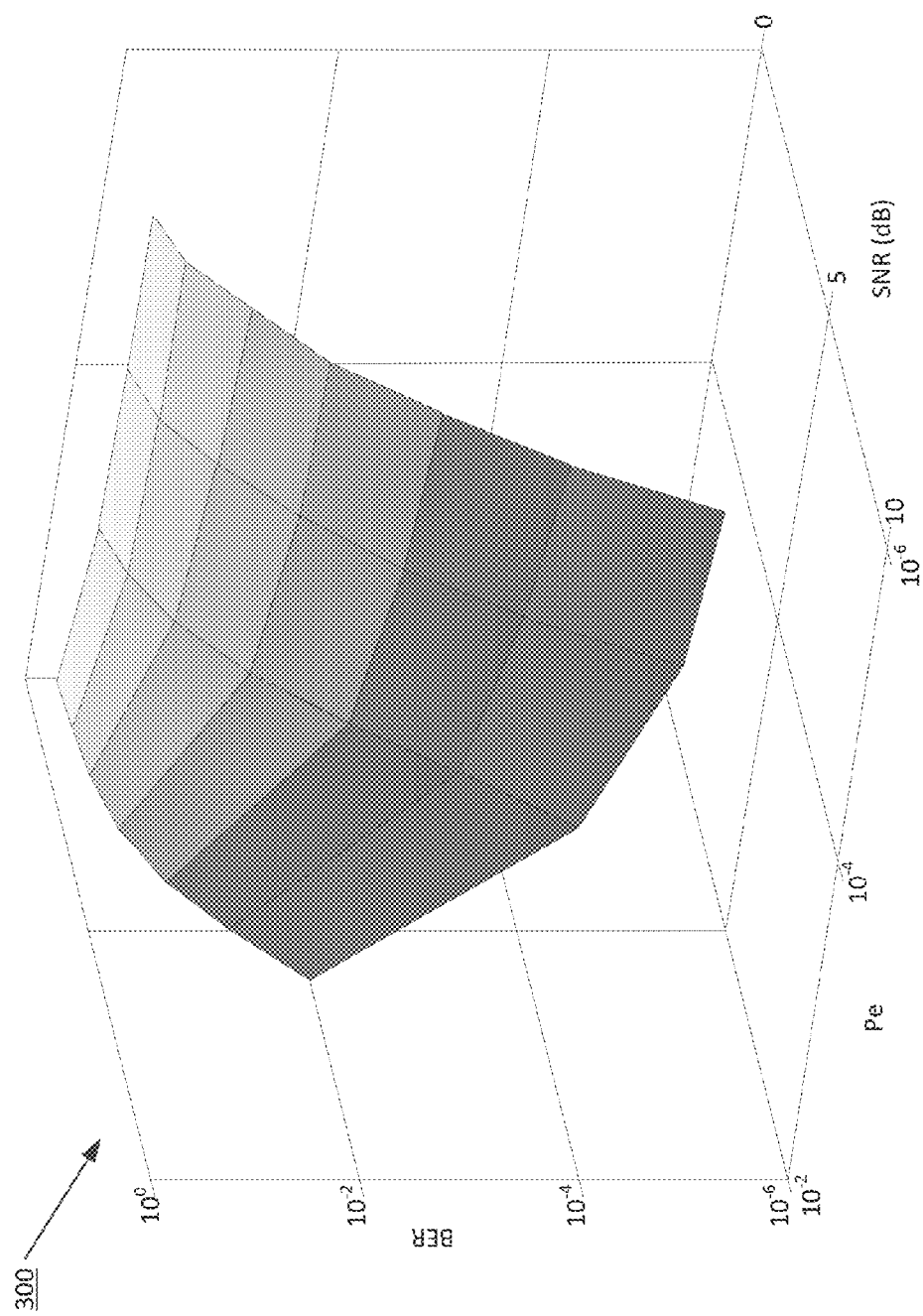
FIG. 3 is an illustration showing that hardware can be considered as a voltage controlled channel.

FIG. 3 is an illustration 300 showing that hardware can be considered as a voltage-controlled channel. FIG. 3 depicts the results which indicate that for a given BER, there exist sets of (SNR, $P_e$) which satisfy this BER. Thus, the memory error rate ($P_e$) can be adjusted based on the received SNR to meet a given quality metric. Alternatively, one can estimate the effect of the memory error on the bit error rate as an extra contribution to the channel noise when compared to an identical system with error free memory. The estimated "hardware noise" is a function of the buffering memory supply voltage (or buffering memory errors, $P_e$s) and the location of the memory within the system. To generate this abstract model, it is important to first quantify how different key blocks in the communication system chain shape the data and noise distribution.

Generally speaking, the performance of SRAM circuits under supply scaling and process variation is well understood. Prior analyses confirm that the access time follows a Gaussian distribution that can be related to the applied supply voltage and the underlying variations in threshold voltage. The explanation that follows begins by discussing a mathematical model for memory errors, followed by the propagation of the distribution through communication building blocks such as filters and FFT units, a zero forcing receiver (as an example), culminating with an entire receiver.

Figure 4:
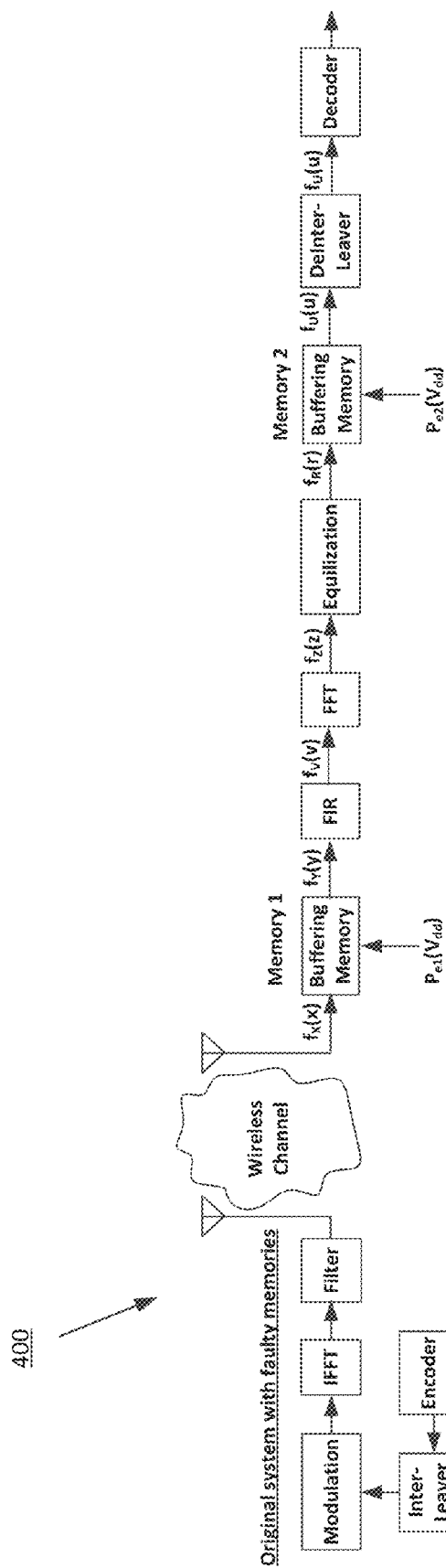
FIG. 4 is a block diagram of a generic OFDM system with faulty memories.

FIG. 4 is a block diagram 400 of a generic OFDM (Orthogonal Frequency Division Multiplexing) system with faulty memories, for consideration. Table I presents a summary of the parameters and the notations used in this system. It is worth mentioning that VoS technique is applied to buffering memories that store data payload of the packet while memories within synchronization loops are protected to guarantee correct operation of the receiver.

TABLE I

Notations and Parameters Description

| Notation | Description |
| --- | --- |
| $V_1, V_2$ | Supply voltage for memory 1 and memory 2 |
| N | Number of bits per memory word |
| $N_{FFT}$ | FFT size |
| $f_\gamma(\gamma)$ | Data distribution after first buffering memory |
| $\phi_v(i\omega)$ | Characteristics function of filtered data |
| $f_{R|s}(r|s)$ | Data distribution after equalization |
| $\bar{\gamma}$ | Average channel power |
| $P_{e1}, P_{e2}$ | Induced error rate in memory 1 and memory 2 |
| N | Normal/Gaussian distribution |
| $f_x(x)$ | Received data distribution |
| $f_v(v)$ | Data distribution after filtering |
| $f_z(z)$ | Data distribution after FFT |
| $f_{U|s}(u|s)$ | Data distribution after second buffering memory |
| $\sigma_{eq}^2$ | Equivalent channel noise variance |

Figure 5:
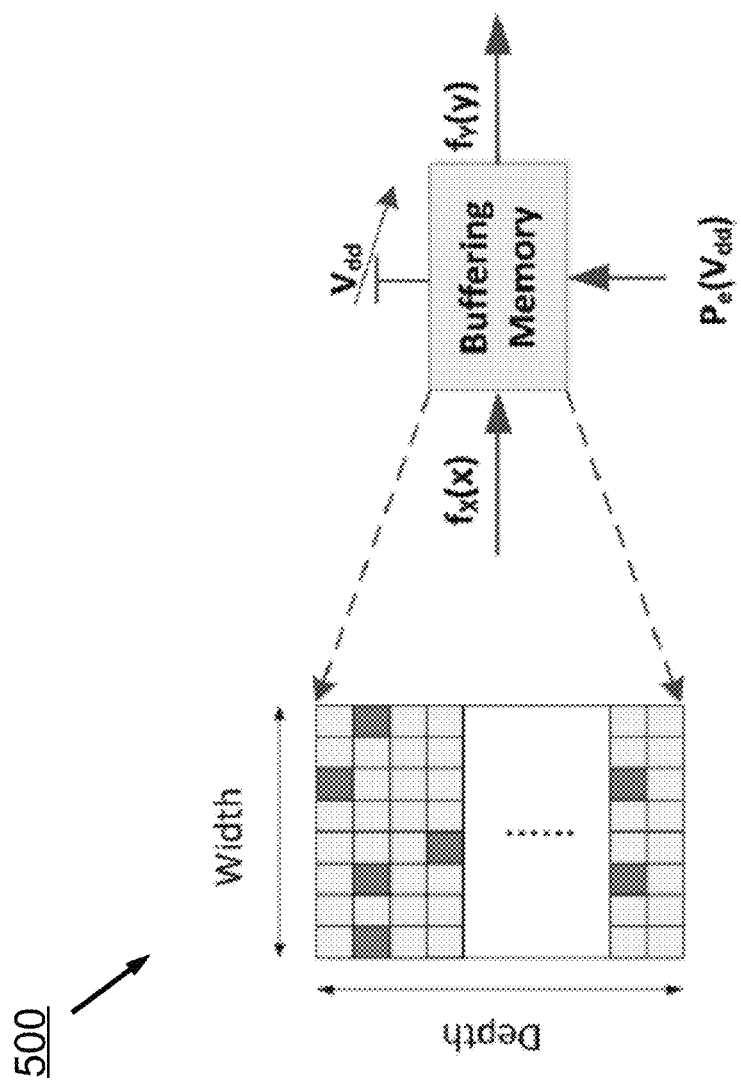
FIG. 5 is an illustration of a memory failure model.

FIG. 5 is an illustration of a memory failure model 500. FIG. 5 illustrates a simplified version of a typical data buffering memory in a communication system where the darkened squares represent erroneous memory cells due to voltage overscaling. The wireless communication channel introduces Additive White Gaussian Noise (AWGN) and the buffering memory introduces random uniform bit-flips depending on the supply voltage. Based on the information from the AWGN channel (namely noise power) and $P_e(V_{dd})$ given the distribution of $f_X(x)$, $f_Y(y)$ and $Y_n$ are determined. In general, data stored as binary numbers in memory can contain both decimal and fractional parts; each data element stored is denoted by a random variable X which has d bits assigned for decimal part and r bits assigned for the fractional part thus forming a number represented by N=d+r bits. To account for negative numbers two's complement representation is assumed. The output distribution can be calculated using (1), $$f_Y(y) = \sum_{k=0}^{N} P(k) f_Y^k(y) \quad (1)$$

Where P(k) is the probability of having k bit flips simultaneously and can be calculated using:

$$P(k) = P_e^k (1-P_e)^{N-k} \quad (2)$$

$f_Y^k(y)$ is the distribution of data when k bit flips occur at one word, where, k (number of bit flips) can be a number from 0 up to N.

$$f_Y^k(y) = \frac{1}{k!} \sum_{\substack{n_1=0}}^{N-1} \sum_{\substack{n_2=0 \\ n_2 \neq n_1}}^{N-1} \cdots \sum_{\substack{n_k=0 \\ n_k \neq n_1 \\ n_k \neq n_{k-1}}}^{N-1} f_{Y_{n_1,n_2,\ldots,n_k}}(y) \quad (3)$$

Figure 6:
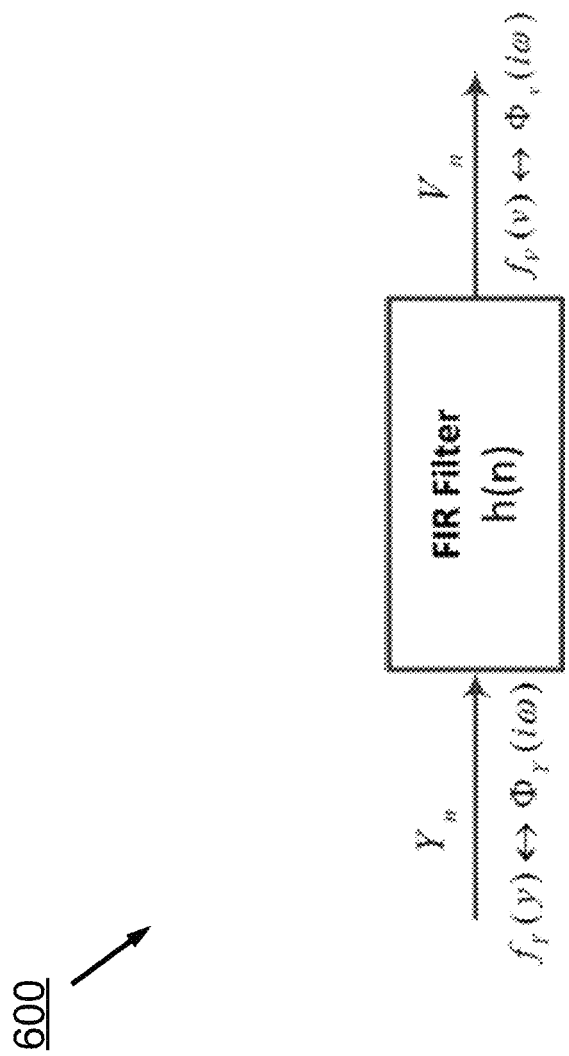
FIG. 6 is an illustration of FIR filtering.

FIG. 6 is an illustration of FIR filtering 600. Filtering is an integral part of any communication system, thus is it important to know how the data distribution changes after filtering. It is well known that filtering Gaussian distributed data will produce a new Gaussian distribution with a different mean and variance. However, when VoS is applied to the buffering memory, the distribution of the retrieved data from the memory deviates from the Gaussian distribution. Hence, it is imperative to quantify the effect of filtering on the distribution of the retrieved data from the faulty buffering memory.

In general, as shown in FIG. 6, given an FIR filter with an impulse response h(k) and input data with a PMF $f_Y(y)$, the statistical PMF of the output data, $f_v(v)$, can be written as the convolution between multiple scaled versions of the input PMF, $f_Y(y)$, as follows:

$$f_V(v) = \frac{1}{\prod_k |h(k)|} f_Y\left(\frac{y}{h_0}\right) * f_Y\left(\frac{y}{h_1}\right) * \ldots \quad (4)$$

In most modern communication systems orthogonal frequency division multiplexing is extensively used to combat channel fading, where the FFT is an integral block. Therefore, it is important to quantify how FFT affects the statistics of a complex sequence of data V for which the real and imaginary parts are independent with the same distribution. This may be the case when demodulating the received OFDM symbols, where the subcarriers have a certain distribution due to the effect on channel noise, memory errors and interference. The real and the imaginary parts of the N-point FFT are given by:

$$Z_r(n) = \sum_{k=0}^{N_{FFT}-1} V_r(k)\cos\left(\frac{2\pi kn}{N_{FFT}}\right) + V_i(k)\sin\left(\frac{2\pi kn}{N_{FFT}}\right) \quad (5)$$

Similarly, $$Z_i(n) = \sum_{k=0}^{N_{FFT}-1} -V_r(k)\sin\left(\frac{2\pi kn}{N_{FFT}}\right) + V_i(k)\cos\left(\frac{2\pi kn}{N_{FFT}}\right) \quad (6)$$

Both the real and imaginary parts of the output can be expressed as:

$$Z_i(n) = \Sigma_{k=0}^{N_{FFT}-1} P_n(k) + Q_n(k) \quad (7)$$

$$Z_r(n) = \Sigma_{k=0}^{N_{FFT}-1} S_n(k) + C_n(k) \quad (8)$$

Since the variables $S_n(k)$, $C_n(k)$, $P_n(k)$ and $Q_n(k)$ and can be considered as random variables, the real and imaginary parts of the output of the FFT ($Z_r$ and $Z_i$) can be derived as a sum of a large number of random variables, which by the central limit theory approaches an asymptotic Gaussian distribution. This means that the distribution of the data after the FFT can be approximated as a Gaussian distribution (with sufficiently large $N_{FFT}$).

Prior work has validated the Gaussian distribution of the data after the FFT and derived an expression of the mean and the variance of the real and imaginary parts as follow:

$$\mu_{Z_r} = \mu_{Z_i} = \begin{cases} N_{FFT} \times \mu_v, & n = 0 \\ 0, & n = 1, 2, \ldots, N_{FFT}-1 \end{cases} \quad (9)$$

$$\sigma_{Z_r}^2 = \sigma_{Z_i}^2 = N_{N_{FFT}} \sigma_v^2 \quad (10)$$

If the distribution of the input data V has a zero mean ($\mu_v=0$) which is the typical case for any wireless channel noise, then:

$$\mu_{Z_r} = \mu_{Z_i} = 0 \quad (11)$$

Hence, one can express the distribution of the data after the FFT in the system as a normal distribution N (0, $N_{FFT}\sigma_v^2$). In which the variance of the data after the filtering can be obtained using the distribution in (4) as follows:

$$\sigma_v^2 = E\{(v-\mu_v)^2\} = E\{v^2\} = \Sigma_v v^2 \times f_v(v) \quad (12)$$

For an OFDM system with a Rayleigh fading channel, the FFT stage converts the data distribution into Gaussian as discussed previously. Hence, the received signal for subcarrier k could be expressed as:

$$z_k = h_k s_k + \tilde{n}_k \quad (13)$$

where $\tilde{n}_k$ is a complex Gaussian noise of zero mean and variance a which can be calculated by using (10) and average channel power $\bar{\gamma}$.

The distribution of the equalized signal $r_k$ is determined as follows. Without loss of generality and for mathematical tractability, assume a least squares equalization where one can express the equalized signal as $$r_k = s_k + \frac{\tilde{n}_k}{h_k} \quad (14)$$

The PMF of the equalized signal can be obtained using given probability concept as described in the following equation $$f_{R|s}(R|s) = \int_{\gamma=0}^{\gamma=\infty} f_{R|s,\gamma}(r|s,\gamma) \times f_\gamma(\gamma) d\gamma \quad (15)$$

where $$\int_{\gamma=0}^{\gamma=\infty} f_{R|s,\gamma}(r|s,\gamma) \sim N\left(s, \frac{\sigma_n^2}{|h_k|^2}\right)$$

and $$\gamma = |h_k|^2, f_\gamma(\gamma) = \frac{1}{\bar{\gamma}} e^{-\frac{\gamma}{\bar{\gamma}}}$$

By using integration tables, the distribution of the equalized data can be given by:

$$f_{R|s}(r|s) = \frac{\sigma_n^2}{\bar{\gamma}}\left[\frac{2\sigma_n^2}{\bar{\gamma}} + (r-s)^2\right]^{-3/2} \quad (16)$$

Then, by storing the equalized data r into another faulty buffering memory (memory 2) as shown in FIG. 4, the distribution of the data read from the memory $f_{U|s}(u|s)$ can be similarly derived as discussed above. The last block before the decoder is the deinterleaver, which does not perform any computation on the data (mainly permutation and data shuffling). That is why the data distribution does not change after the deinterleaver. Furthermore, since the errors introduced within the memory are spatially uniform (not burst or cluster errors), the deinterleaver does not change the variance of the errors and hence does not change the performance quality of the decoder with regards to memory errors.

As mentioned above, one can model the hardware as an extension of the wireless channel in communication systems where quality is controlled by operating conditions such as frequency and supply voltage. By propagating data statistics through various communication blocks, the area under the tail of the resultant distribution (after a certain threshold depending on the modulation) represents the bit error rate (BER). The key idea is to find an equivalent Gaussian noise distribution that has the same area under the tail of the distribution (or equivalently, the same BER) as the corrupted data statistics.

Figure 7:
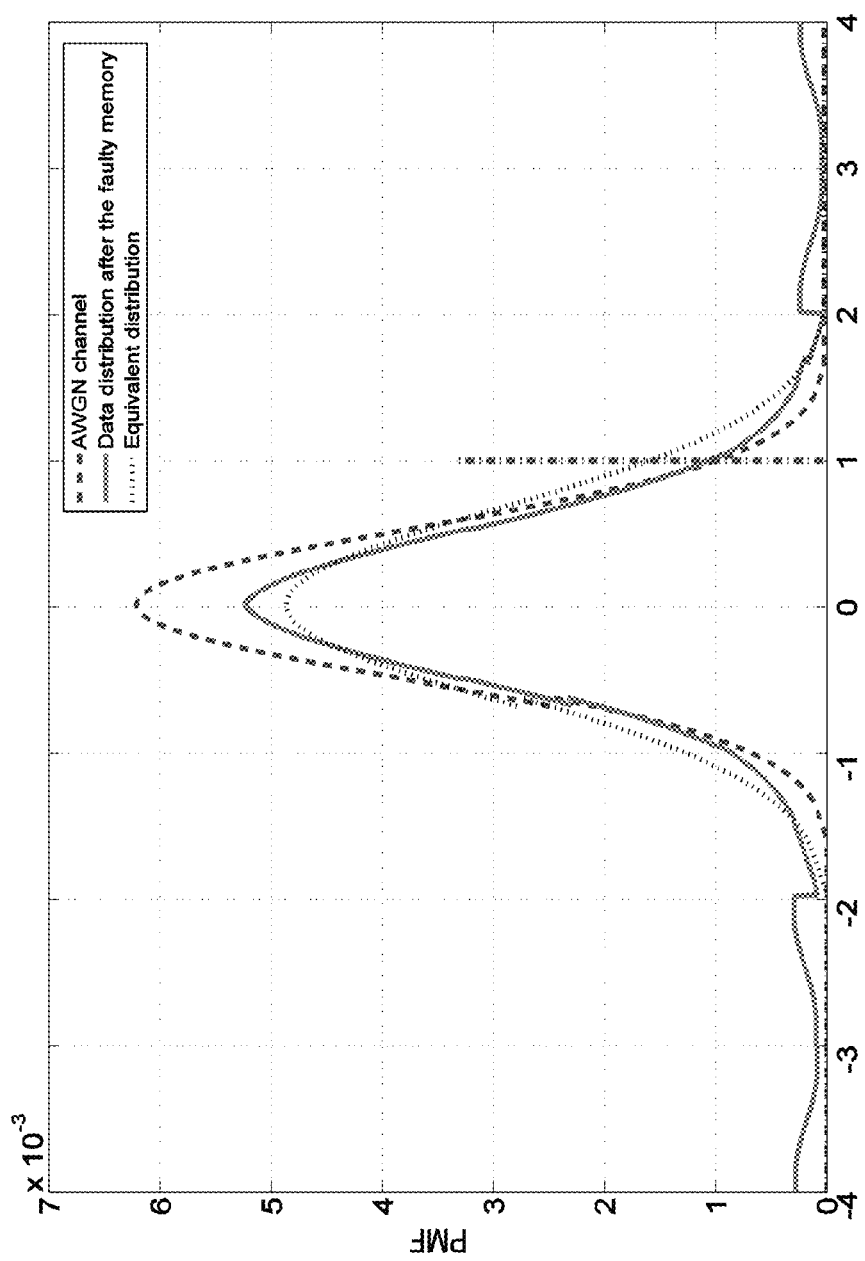
FIG. 7 is an illustration of an arbitrary distribution of input data sequence.

As shown in FIG. 7, the distribution 700 of the data affected by an additive white Gaussian noise (AWGN) channel stored in a faulty memory can be approximated by another Gaussian distribution that captures both AWGN and memory noise while assuming that the storing memory is fault-free. In other words, the area under the tail of both distributions after a given threshold is equal to BER.

For analysis, binary phase shift keying (BPSK) modulation is assumed for simplicity. However, the same methodology could be applied to any other modulation scheme without any loss of generality. Considering the system with faulty memories shown in FIG. 4, the BER performance (before the FEC decoder) could be obtained by:

$$BER = P(s_1) \int_{-\infty}^{0} f_{v|s_1}(v|s_1) dv + P(s_2) \int_{0}^{\infty} f_{v|s_2}(v|s_2) dv \quad (17)$$

Where $P(s_1)$ and $P(s_2)$ represents the probability of transmitting the BPSK symbols ($S_i = \pm 1$, I=1,2) and $f_{U|s_i}(u|s_i)$ is the distribution of the data before the slicer. Due to symmetry of the tails of the distributions $f_{U|s_1}(u|s_1)$ and $f_{U|s_2}(u|s_2)$ and assuming equally likely symbols, the BER is expressed in (18).

$$P(s_1) = P(s_2) = 0.5 \quad (18)$$
$$\int_{-\infty}^{0} f_{U|s_1}(u|s_1) dv = \int_{0}^{\infty} f_{U|s_2}(u|s_2) du$$
$$BER = \int_{0}^{\infty} f_{U|s_i}(v|s_i) dv$$

where i=1,2.

The BER is calculated mathematically based on propagating the data distribution after the memory, $f_x(x)$, through the communication system blocks as presented in the previous section. Consequently, the modulation BER after the slicer is mathematically calculated based on the derived distribution.

Once the BER of the system with faulty memory is calculated, an equivalent noise, $n_{eq}$ with zero mean and variance $\sigma_{eq}^2$ is determined such that the equivalent system with ideal memories achieves the same BER performance of the original system with faulty memories. The Gaussian distribution of the equivalent noise can be written as:

$$n_{eq} \sim f_{N_{eq}}(n_{eq}) = \frac{1}{\sqrt{2\pi} \, \sigma_{eq}} e^{-\frac{n_{eq}^2}{2\sigma_{eq}^2}} \quad (19)$$

Figure 8:
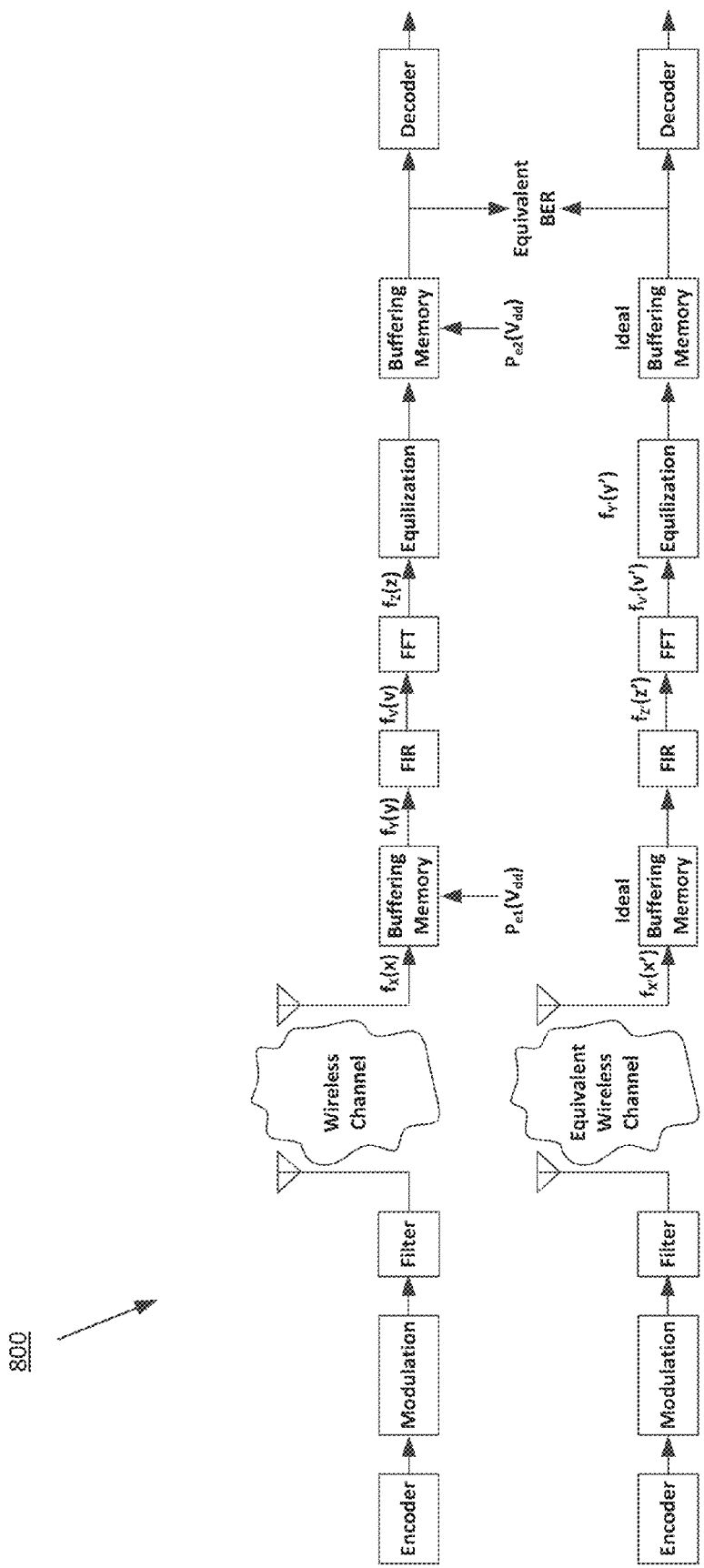
FIG. 8 is a block diagram of an exemplary equivalent noise system model, according to one embodiment of the present system.

FIG. 8 is a block diagram of an exemplary equivalent noise system model, according to one embodiment of the present system.

A mathematical formula of the $BER_{eq}$ is calculated using the probability mass functions (PMF) $f_{U'}(u')$ of the data after the equalizer as shown in FIG. 8 (800). Similarly, due to symmetry of the distribution tails and assuming equally likely symbols the BER is expressed by $$BER_{eq} = \int_{0}^{\infty} f_{v'/s_i}(v'/s_i) dv' \quad (20)$$

where $f_{U'/s_i}(u'/s_i)$ is obtained by propagating the received data distribution coming from the equivalent noise distribution $f_{X'/S_i}(x'/s_i)$ through the data path blocks (Memory, FIR, FFT and Equalizer). Since the memory is perfect with no errors, the distribution of the data after the memory does not change. Due to the filter linearity, passing the equivalent noise $n_{eq}$ through the filter stages will produce another Gaussian $n_{eq_{filter}}$ with a zero mean and variance $\sigma_{eq\_filter}^2$ given by:

$$\sigma_{eq\_filter}^2 = \sum_k h(k)^2 \sigma_{eq}^2 \quad (21)$$

Since the equivalent noise after the filtering $n_{eq_{filter}}$ has zero mean and variance $\sigma_{eq\_filter}^2$, the Gaussian noise after the FFT $n_{eq\_FFT}$ will have zero mean and variance $$\sigma_{eq\_FFT}^2 = N\sigma_{eq\_filter}^2 \quad (22)$$

This Gaussian noise will propagate through another ideal memory, and hence the statistics of the output data will be the same. The received signal after the FFT for each subcarrier can be expressed as:

$$z'_k = h_k s_k + \tilde{n}_{FFT,k} \quad (23)$$

where $$\tilde{n}_{eq\_FFT,k} \sim \mathbb{N}(0, \sigma_{eq\_FFT}^2)$$

After the ZF equalization:

$$\hat{r}_k = s_k + \tilde{n}_{eq\_FFT,k}/h_k \quad (24)$$

The distribution of $\hat{r}_k$ can be written as $$f_{\hat{r}_k|s}(\hat{r}_k|s_k) = \frac{\frac{\sigma_{eq_{FFT}}^2}{\gamma}}{\sqrt{\left[\frac{2\sigma_{eq_{FFT}}^2}{\gamma} + (\hat{r}_k - s_k)^2\right]^3}} \quad (25)$$

Hence the BER is calculated as follow:

$$BER = \int_{\hat{r}_k=0}^{\hat{r}_k=\infty} f_{\hat{r}_k|s}(\hat{r}_k|s_k) d\hat{r}$$

Finally, after using integration table formula, the BER of the equivalent system is written as $$BER_{eq} = \frac{1}{2} \times \left[1 - \sqrt{\frac{1}{1 - 2N\sigma_{eq\_filter}^2}}\right] \quad (26)$$

Using the mathematical formula of the BER in (26) for the equivalent system and that of the original system with faulty memories in (18), the variance of the equivalent noise $n_{eq}$ can be calculated.

$$\sigma_{eq} = \sqrt{\frac{1-(1-2\times BER)^2}{2N \times \sum_k h(k)^2 \times (1-2\times BER)^2}} \quad (27)$$

where the BER is obtained by integrating the distribution $f_v(v)$ as described in Eq. (18).

Forward error correction (FEC) decoders can be employed at the receiver to detect and correct errors. In one embodiment, convolutional codes and Viterbi decoding algorithm are employed at the receiver to decode transmitted bits.

Figure 9:
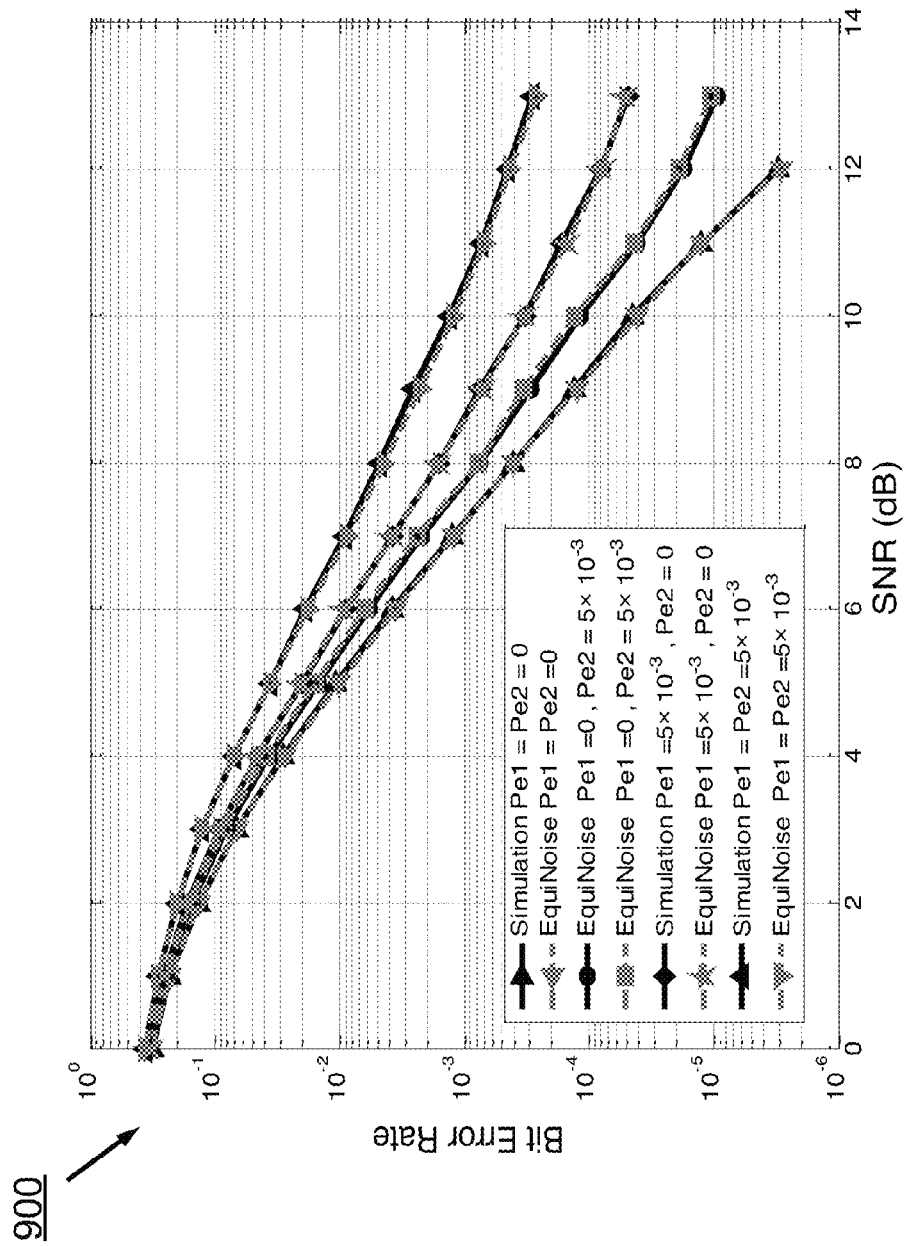
FIG. 9 is an illustration showing the BER performance after the Viterbi decoder for both systems in FIG. 8 with different memory error rates.

Hard-input FEC decoders employ hamming distance to find the branch metric distance. Since both the original and equivalent systems have the same BER before the decoder, both achieve the same coded-BER. FIG. 9 shows the BER performance 900 after the Viterbi decoder for both systems in FIG. 8 with different memory error rates. Note the close match between the simulations results of the original system with faulty systems and these of the equip-noise.

Figure 10:
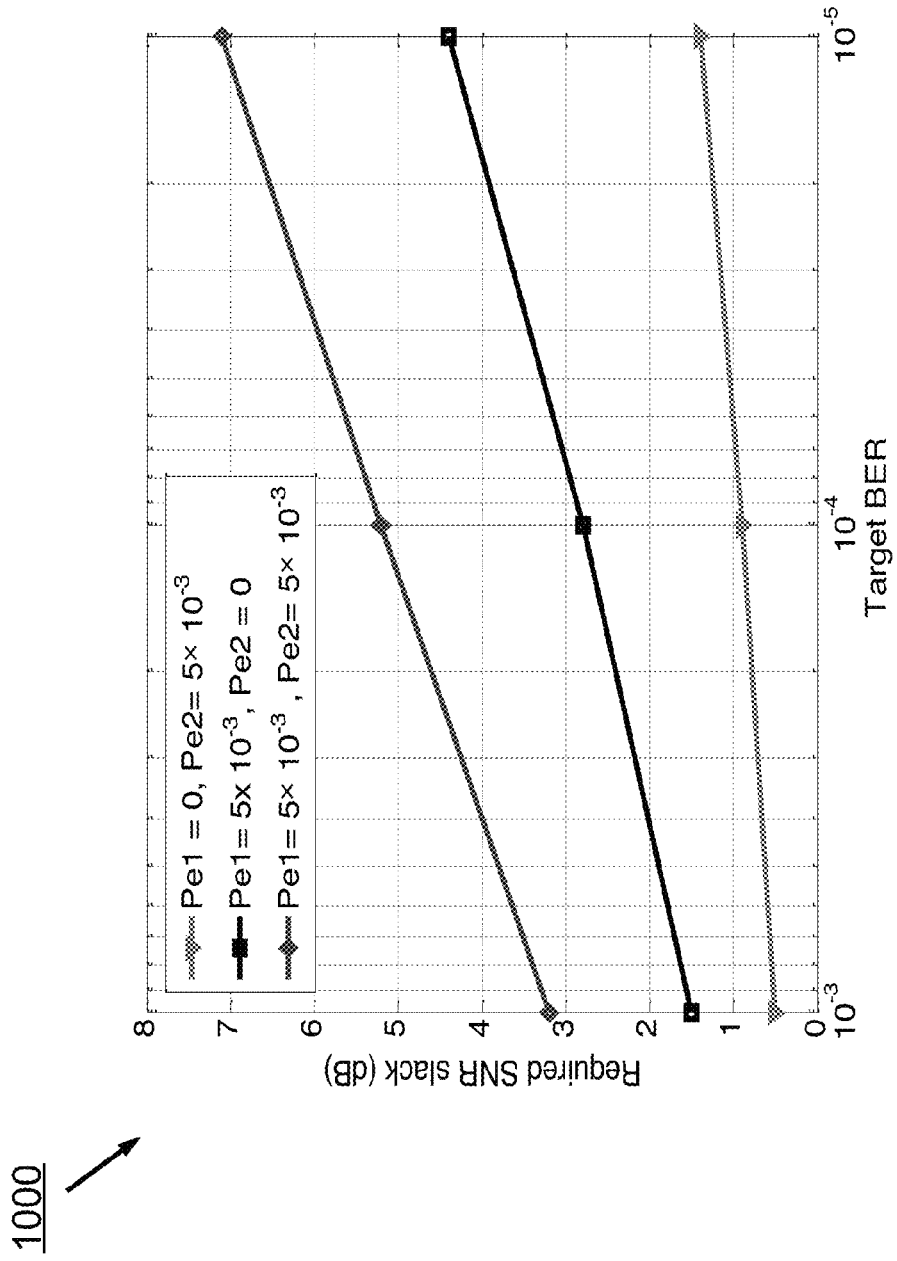
FIG. 10 is an illustration showing the SNR slack versus the target BER for different combination of memory error rates.

FIG. 10 shows the signal to noise ratio (SNR) slack versus the target BER for different combinations of memory error rates 1000. The memory errors manifest as a reduction in the received SNR. It is important to note that the memory error effects on SNR depend on the location of the memory as will be explained hereafter.

Figure 11:
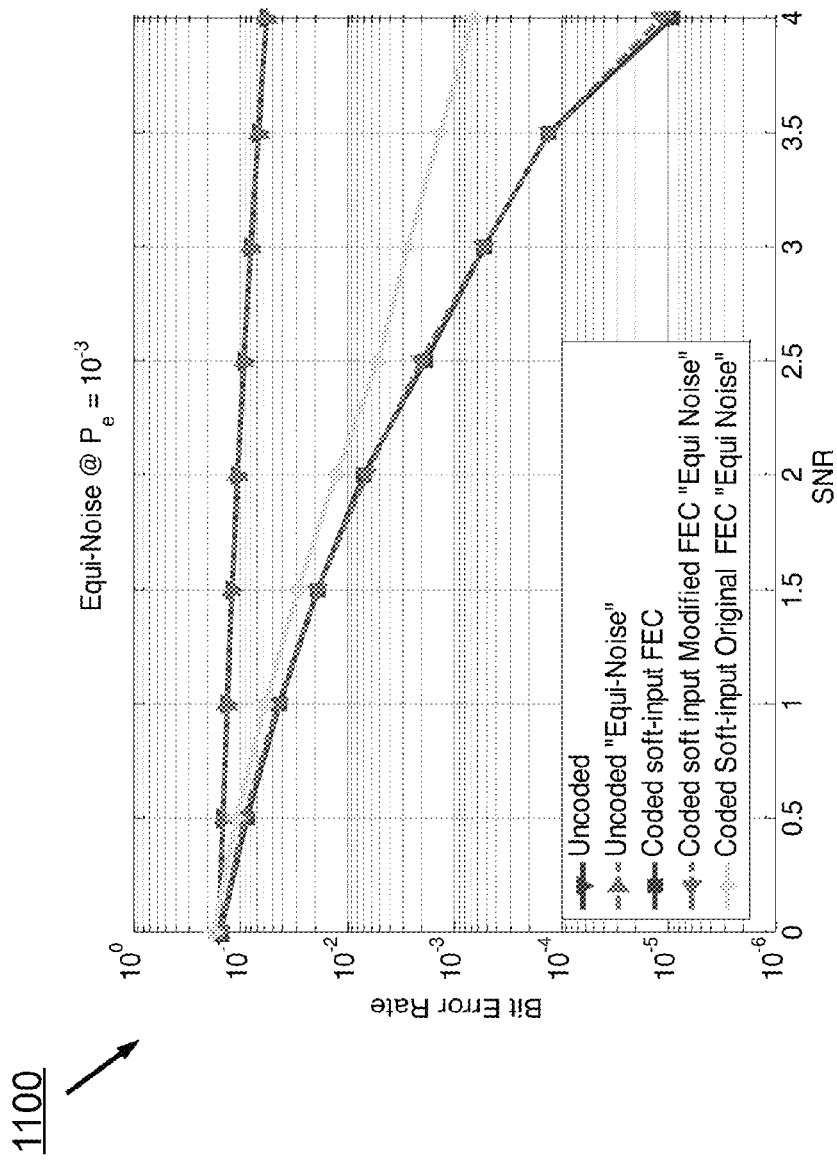
FIG. 11 is an illustration of equivalent noise with soft-input FEC.

The conventional soft-input Viterbi algorithm is based on the Maximum Likelihood (ML) criteria assuming a Gaussian noise. However, incorporating faulty memories results in a distribution that is slightly non-Gaussian. Due to the large coding gain associated with FEC, the equivalence of the BER after the conventional FEC decoder is not achieved as shown in FIG. 11 (1100). This is addressed by incorporating the actual statistics of the data while calculating the log likelihood ratios (LLR) as described by A. Hussien, M. Khairy, A. Khajeh, A. Eltawil, and F. Kurdahi, "Combined Channel and Hardware Noise Resilient Viterbi Decoder," IEEE Asilomar Conference on Signals, Systems, and. Computers, pp. 395-399, 7-10 November, which presents a modified FEC decoder that is based on the ML criteria. The work was expanded to include many different families of FEC such as Turbo decoders as well as Low Density Parity Codes.

Figure 12:
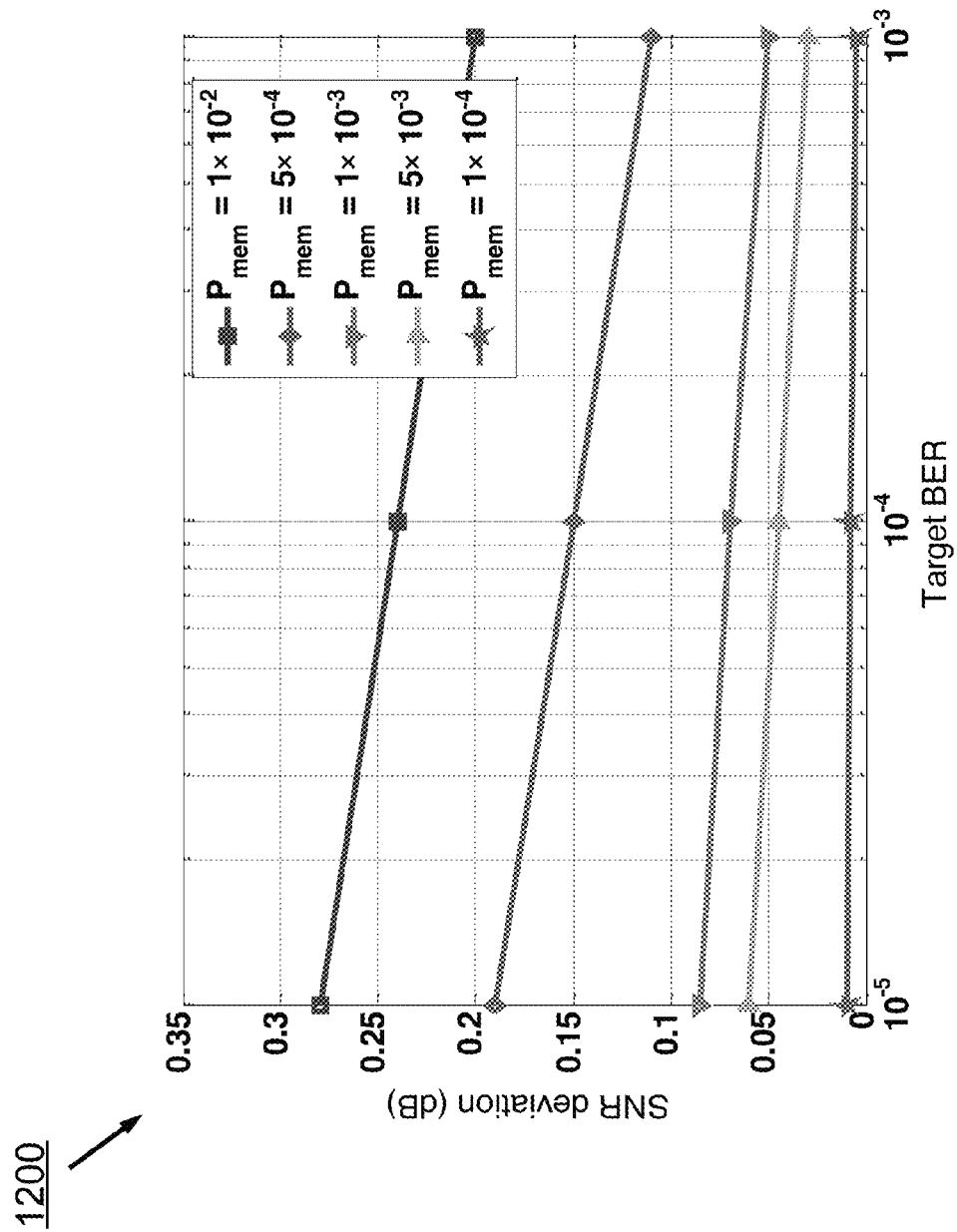
FIG. 12 is an illustration of model accuracy for different memory error rate and target BER with soft-input FEC.

FIG. 12 validates this approach where a very close match 1200 exists between the BER performance of the modified FEC for the system with faulty memories and the conventional FEC for the equivalent system. It is worth mentioning that for very high error rates in the memory ($P_e>10^{-2}$) a divergence of less than 0.27 dB occurs at a target BER of $10^{-5}$. For more realistic values of memory error ($P_e>10^{-4}$), the model divergence is less than 0.01 dB. The previous analysis can be generalized for any other modulation scheme (QPSK, 16-QAM or 64-QAM), as well as for any number of memories in the system.

In typical communication systems, buffering memories are needed to store the data before and after processing by basic blocks such as FFT, channel estimation, interleaver and equalization. These memories differ in size and the level of the data redundancy. Generally speaking, one would expect that the closer the buffering memory is to the slicer, the lower the data redundancy level, however, as will be discussed later, this is not necessarily always the case.

Depending on its location in the processing chain, each block affects system performance in different ways. It is therefore interesting to evaluate the impact of each buffering memory on the system quality of service (QoS) measured by the BER. A straightforward way to address this problem is by performing a sensitivity analysis of the system's BER with respect to the amount of error rate applied at each memory.

Two buffering memories are under consideration. The first one ($M_1$) is the buffering memory at the receiver front end immediately before the analog to digital conversion. While the second memory ($M_2$), is the memory preceding the FEC decoder. The sensitivity of the BER to the probability of error is defined as:

$$S_{P_e}^{BER} = \frac{\partial BER}{\partial P_e} \Big/ \frac{BER}{P_e} \quad (28)$$

where the BER is given by $$BER = \int_0^\infty f_v(v, P_e)dv \quad (29)$$

and $f_v(v, P_e)$ is the data distribution before the slicer which depends on the error rate applied at the buffering memory under consideration.

$$\frac{\partial BER}{\partial P_e} = \int_0^\infty \frac{\partial f_v(v, P_e)}{\partial P_e} dv \quad (30)$$

where the derivative can be approximated by $$\frac{\partial f_v(v)}{\partial P_e} \approx \frac{f_v(v, P_e + \Delta P_e) - f_v(v, P_e)}{\Delta P_e} \quad (31)$$

Figure 13:
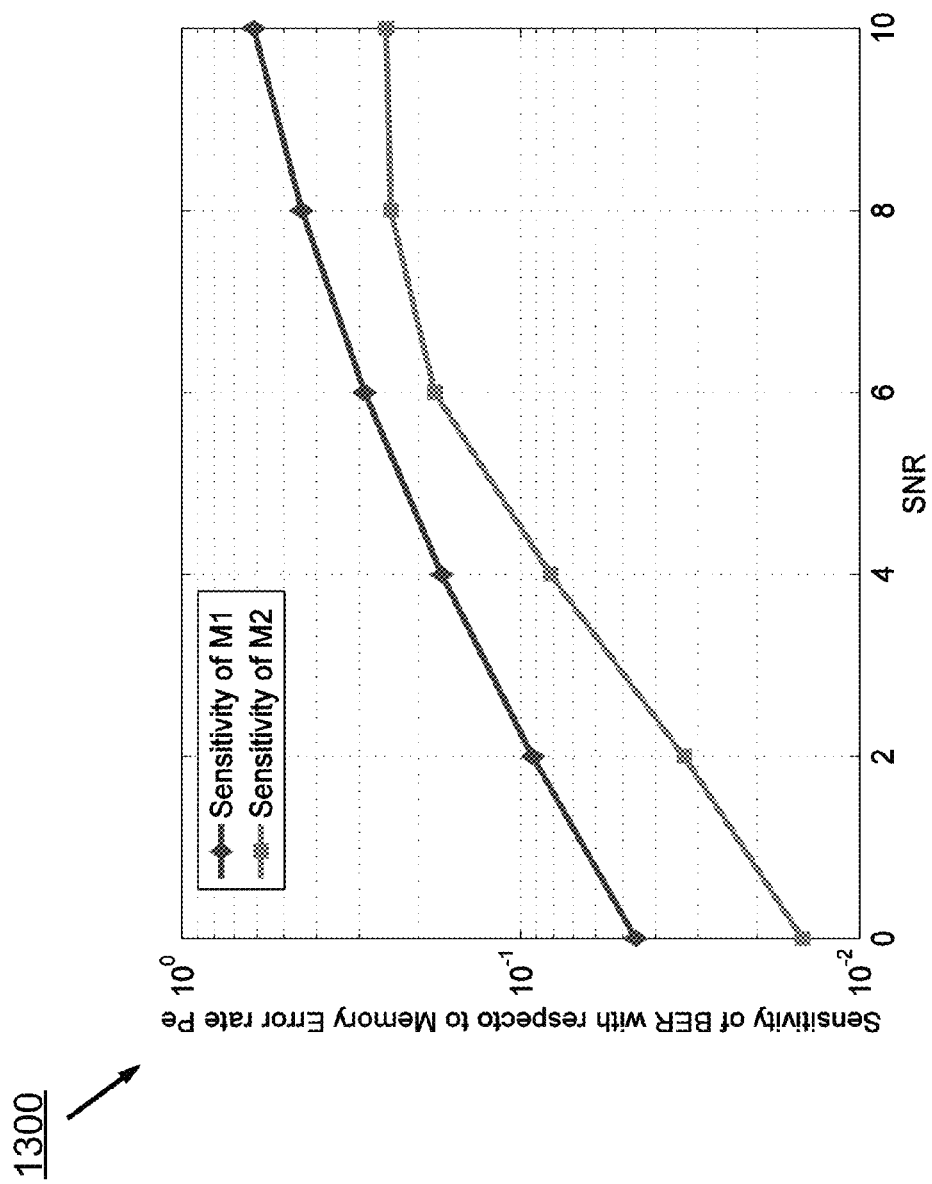
FIG. 13 is an illustration of sensitivity of BER at error rate $5 \times 10^3$.

FIG. 13 illustrates the sensitivity 1300 of the BER with respect to an error rate of $5\times10^{-3}$ in each memory, assuming an un-coded system. The first observation is that as the SNR increases, the system performance is more sensitive to error rate in the memories. This is expected since at higher SNR, the effect of channel noise is less as compared to the errors from the memory.

The second observation is that, for the same error rate, M1 and M2 impact the system differently. Interestingly, contrary to what was expected, system performance is more sensitive to errors in M1 than M2 although M2 is closer to the slicer as compared to M1. The reason behind that is the FFT, since it is not a one-to-one mapping process. Any error at one of the inputs of the FFT will affect all the N-data at the output of the FFT. Therefore, errors in M1 have a more severe effect on system performance, especially for larger FFT sizes.

Based on the equivalent noise modeling presented herein, the effect of memory supply voltage over-scaling (VOS) on the final metric of the system (BER in this case) can be mathematically derived. For the different combinations of the supply voltages, the present equivalent noise technique provides a mathematical model that precisely estimates system performance at any given SNR as a result of the applied power management technique. A system with two buffering memories is considered. The purpose of the algorithms is to find the appropriate memory supply voltage that maximizes power savings by exploiting the available SNR slack while keeping the system performance within the required margin.

The supply voltages and the equivalent memory error rates shown in Table II are based on HSPICE circuit simulations of a 6T SRAM cells using 65 nm CMOS predictive. Different SRAM memories could have different memory error rates due to process variations. Furthermore, due to aging and temperature variations, memory error rates may vary. Hence, Built-in self-test (BIST) mechanisms could be applied to measure and characterize memory error rates under VoS. The power manager algorithm will then run the BIST technique for each memory to update the entries of the memory error rates for different supply voltages. Since temperature variations and other factors that affect the memories are slow processes, once the table is constructed, it will need infrequent updates, with negligible overhead and the throughput degradation.

TABLE II

Supply Voltage and Corresponding Memory Error Rate

| $V_{dd}$ | 1.0 | 0.85 | 0.75 | 0.65 |
|---|---|---|---|---|
| $P_e$ | $1.69e^{-15}$* | $5.21e^{-12}$ | $1.8e^{-6}$ | $2.7e^{-3}$ |

*extrapolated

Figure 14:
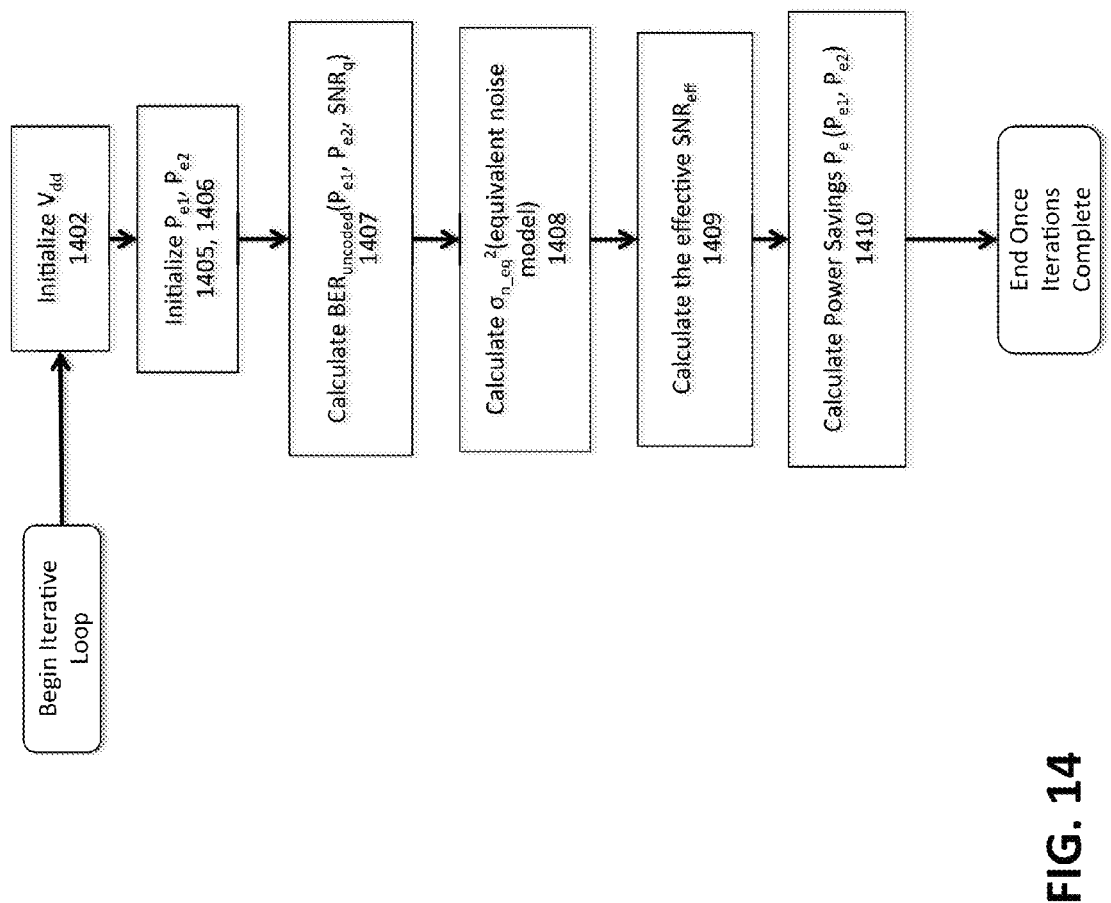
FIG. 14 is an illustration of Algorithm 1, an offline power manager algorithm, for use with the present system.

The power management methodology presented herein is composed of two parts. The first part is an offline algorithm that characterizes the effective SNR of the system based on the memory error rates and received SNR. In more details, for every pair of memory supply voltages ($V_{Mem1}$, $V_{Mem2}$), the algorithm reads the corresponding memory error rates ($P_{e1}$, $P_{e2}$). Then based on the derived PMF distribution under VoS, the equivalent noise that achieves the same BER under these supply voltages is calculated. Hence, the value of the effective SNR is tabulated for the tuple of ($SNR_{rec}$, $V_{Mem1}$, $V_{Mem2}$). The details of this algorithm are explained in Algorithm 1 below, which is also shown in FIG. 14.

| Algorithm 1: Offline Power Manager Algorithm | |
|---|---|
| 1:   for each quantized SNR do | |
| 2:     $V_{dd}$ = {1.0, 0.85, 0.75, 0.65} | (1402) |
| 3:     for $V_{Mem1}$ = {1.0, 0.85, 0.75, 0.65} | |
| 4:       for $V_{Mem2}$ = {1.0, 0.85, 0.75, 0.65} | |
| 5:         $P_{e1}$ = LUT($V_{Mem1}$): | (1405) |
| 6:         $P_{e2}$ = LUT($V_{Mem2}$); | (1406) |
| 7:         Calculate $BER_{uncoded}$($P_{e1}$, $P_{e2}$, $SNR_q$); | (1407) |
| 8:         Calculate $\sigma_n\_eq^2$(equivalent noise model); | (1408) |
| 9:         Calculate the effective $SNR_{eff}$; | (1409) |
| 10:        Calculate Power Savings $P_s$($P_{e1}$,$P_{e2}$); | (1410) |
| 11:       end for | |
| 12:     end for | |
| 13: end for. | |

The size of the look up table (LUT) depends on the quantization resolution of the received SNR and the number of the allowed memory supply voltages. Assuming a linear quantization of the received SNR with a step $\Delta SNR$ and 12-bit precision to store the effective SNR, the size of one LUT for a certain combination of ($V_{Mem1}$, $V_{Mem2}$) is given by $$LUT_{size} = 12 \times \frac{SNR \text{ range}}{\Delta SNR} \text{bits}$$

Hence, the total required storage for the different combination of the two memories supply voltages can be expressed as:

$$N_{mem\_volt}^2 \times LUT_{size}$$

Figure 16:
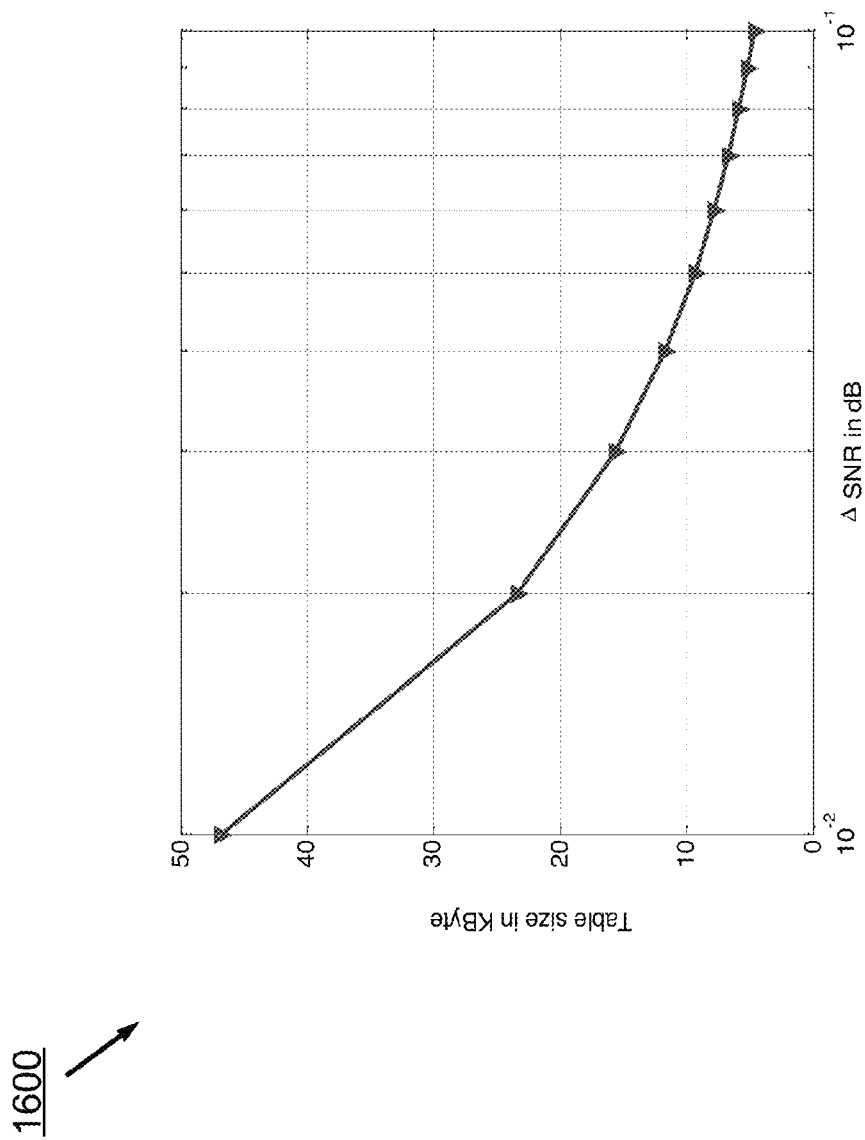
FIG. 16 is an illustration showing required memory storage of the LUT versus the SNR quantization step.
Figure 17:
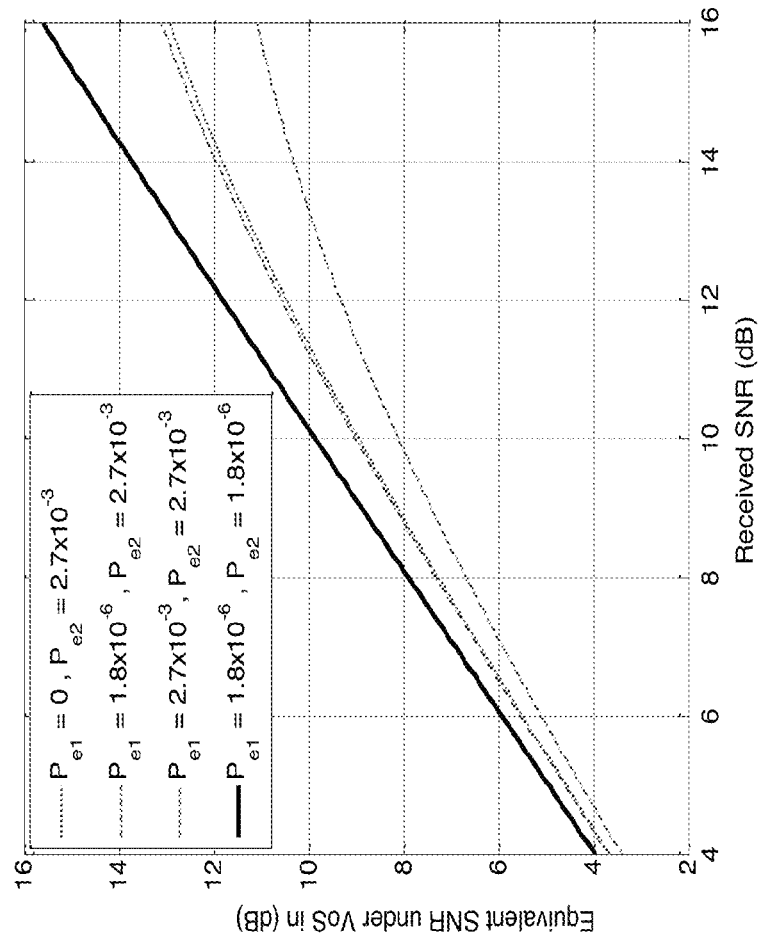
FIG. 17 is an illustration showing the mapping between the received SNR and the effective SNR under different memory error rates.
Figure 18:
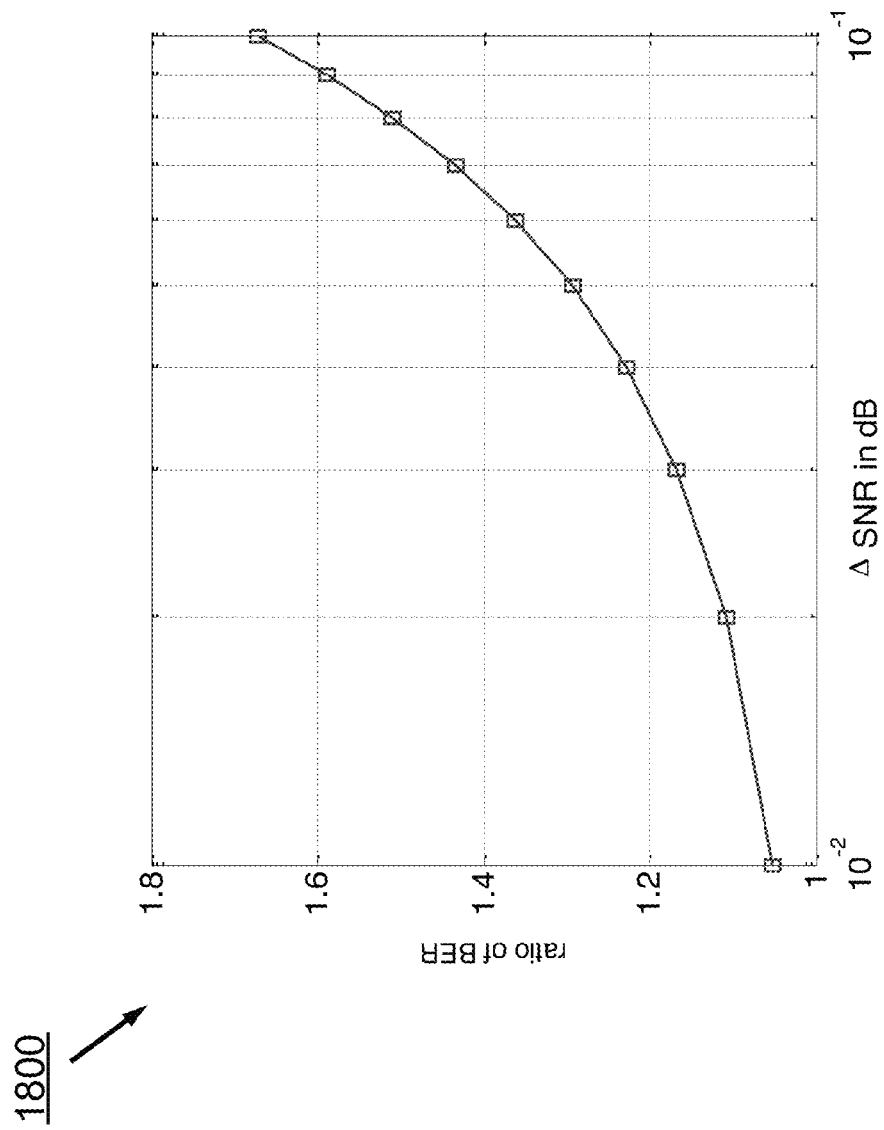
FIG. 18 is an illustration showing the maximum ratio of the LUT-based BER to the exact BER without quantization versus the SNR step resolution.

FIG. 16 (1600) shows the required memory storage of the LUT versus the resolution of the $\Delta SNR$ step. As expected, a lower quantization resolution of the received SNR will result into a large storage requirement. On the other hand, this quantization will result into a reduced accuracy of the algorithm where a range of the received SNR's are mapped into one quantized effective SNR. FIG. 17 shows the mapping 1700 between the received SNR and the effective SNR under different memory error rates. It is clear that for a quantization error of $\Delta SNR/2$ in the received SNR, the maximum error of the effective SNR is also of $\Delta SNR/2$ which occurs at small error rates in the memories or at lower values of the received SNR. To reflect this quantization error in the effective SNR to the accuracy of the calculated BER, FIG. 18 (1800) shows the maximum ratio of the LUT-based BER to the exact BER without quantization versus the SNR step resolution. Based on this analysis, the quantization step is chosen to be 0.02 dB to have a considerable small LUT and a maximum error rate less than 10% as seen in FIG. 18. Another pessimistic approach to alleviate this error can be applied where a safety margin of 0.01 dB (half the SNR step resolution) can be subtracted from the stored effective SNR.

Figure 15:
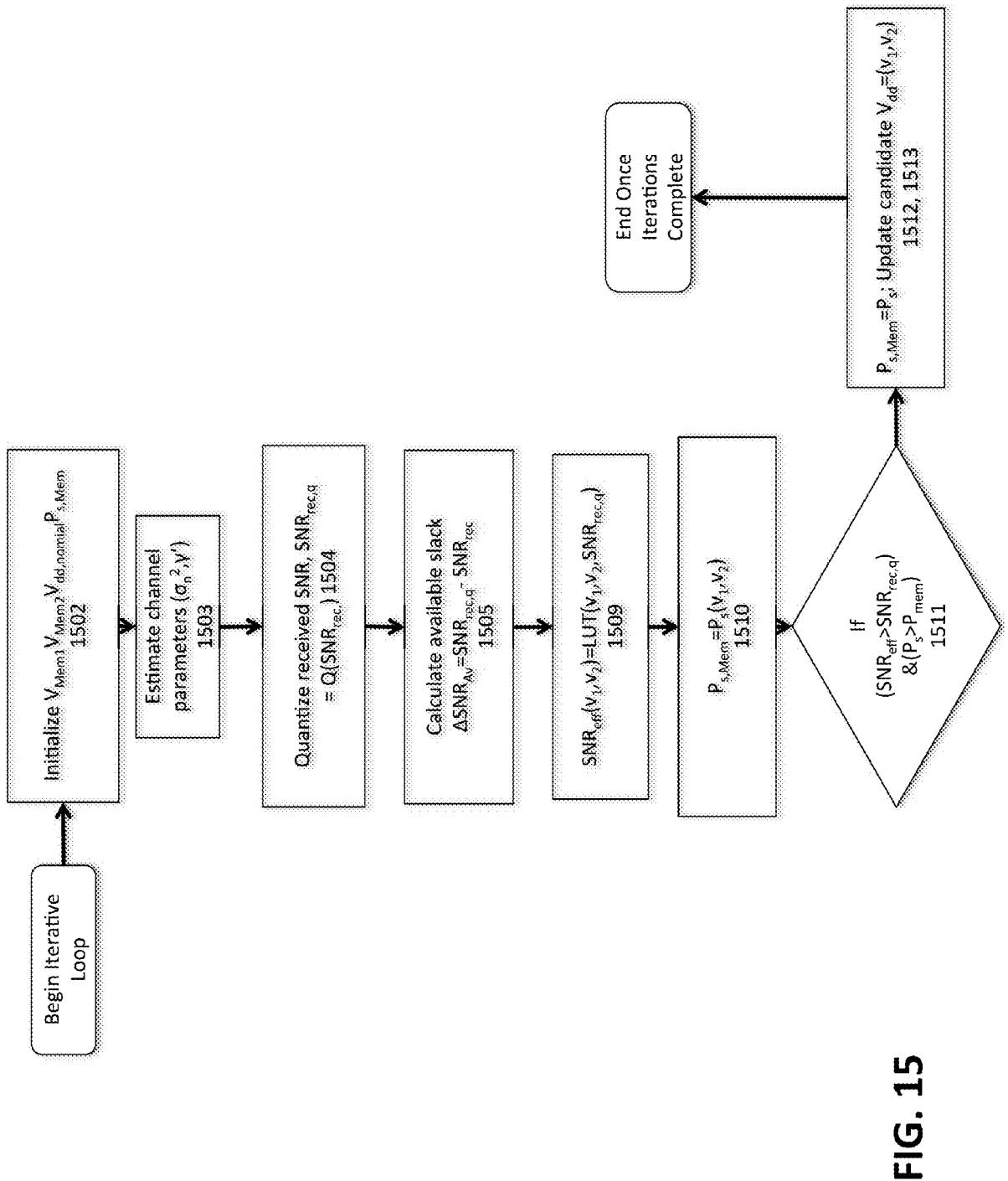
FIG. 15 is an illustration of Algorithm 2, an online power manager algorithm, for use with the present system.

The second part of the algorithm is the online part, which updates the memory supply voltages to track channel SNR variations. The online algorithm shown below and in Algorithm 2 (see FIG. 15) runs every time step ($\Delta T$) which is chosen to be smaller than the coherence time of the channel ($\Delta T < T_{coherence}$). Initially, it estimates the channel parameters and calculates the average received SNR. Based on the target BER performance of the system, a target $SNR_{req}$ is obtained to achieve the BER requirement. Hence, the available slack in the SNR ($\Delta SNR$) is calculated. The algorithm loops over the different combinations of quantized memory supply voltages, then reads the equivalent effective SNR from the LUT's and the corresponding power savings (steps 9-10). The combination of the memories supply voltages that has the highest power savings and achieves the target BER performance is then chosen by the power manager for the buffering memories (steps 11-13).

| Algorithm 2: Online Power Manager Algorithm | |
|---|---|
| 1:   for each time step do | |
| 2:     Initialize $V_{Mem1}$ = $V_{Mem2}$ = $V_{dd,nominal}$, $P_{s,Mem}$ = 0 | (1502) |
| 3:     Estimate channel parameters ($\sigma_n^2, \gamma'$) | (1503) |
| 4:     Quantize received SNR, $SNR_{rec,q}$ = Q($SNR_{rec}$) | (1504) |
| 5:     Calculate available slack $\Delta SNR_{Av}$=$SNR_{rec,q}$− $SNR_{rec}$ | (1505) |
| 6:     If $\Delta SNR_{Av}$>0 | |
| 7:       for $V_{Mem1}$ = {1.0, 0.85, 0.75, 0.65} | |
| 8:         for $V_{Mem2}$ = {1.0, 0.85, 0.75, 0.65} | |
| 9:           $SNR_{eff}$($v_1$,$v_2$) = LUT($v_1$,$v_2$,$SNR_{rec,q}$); | (1509) |
| 10:          $P_{s,Mem}$ = $P_s$($V_1$,$V_2$); | (1510) |
| 11:          If ($SNR_{eff}$>$SNR_{rec,q}$)&($P_s$>$P_{s,Mem}$) | (1511) |
| 12:            $P_{s,mem}$=$P_s$; | (1512) |
| 13:            Update candidate $V_{dd}$=($v_1$,$v_2$); | (1513) |
| 14:         end if; | |
| 15:       end for; | |
| 16:     end for; | |
| 17: end for. | |

EXAMPLE

Figure 19:
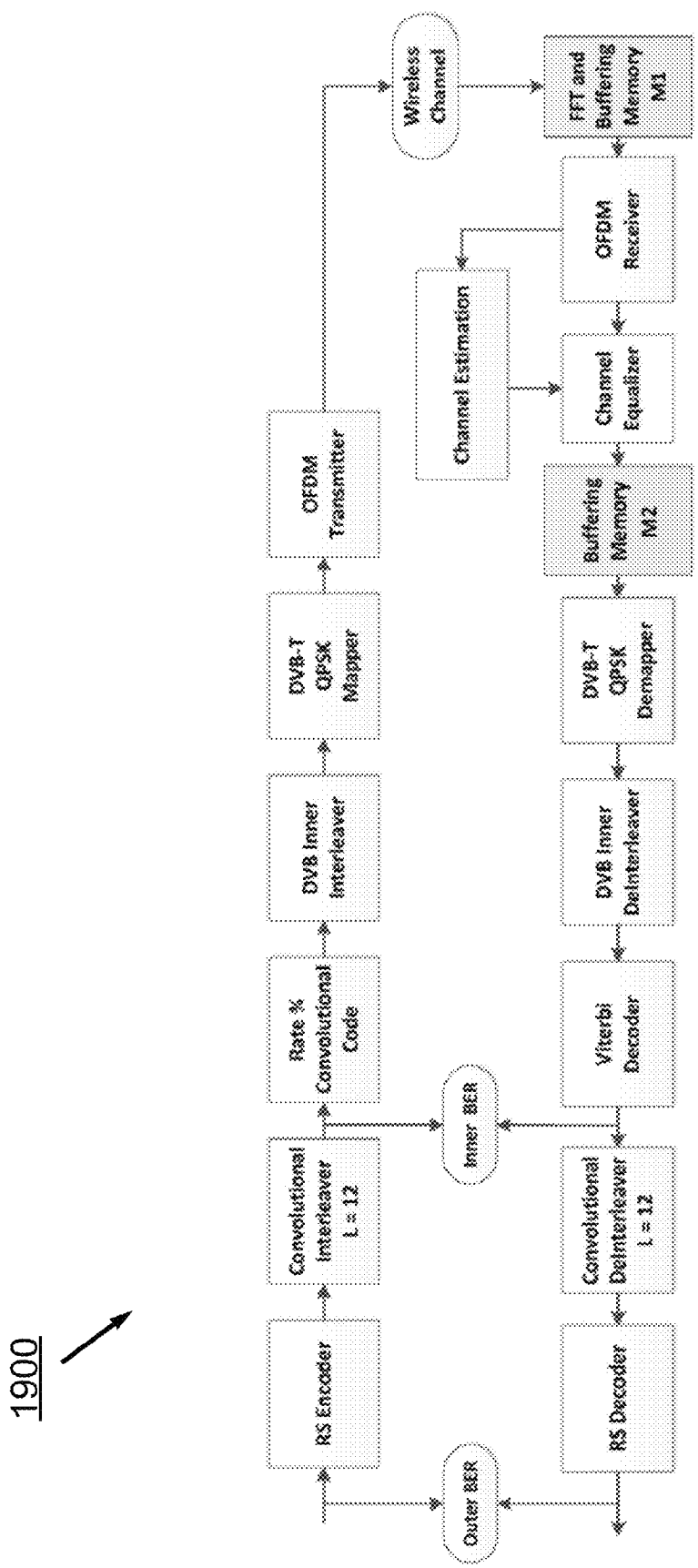
FIG. 19 is an illustration of an exemplary DVB transceiver model.

FIG. 19 is an illustration of an exemplary DVB transceiver model 1900. To fully evaluate the proposed approach, the methodology disclosed herein was applied to a DVB-T system as shown in FIG. 19. At the transmitter, the input transport stream is applied to the outer coder, shortened Reed-Solomon (RS 204,188) followed by a convolution interleaver. The second step of channel coding is applied via a puncturing convolutional coder which is followed by the inner DVB interleaver. The mapper module uses three constellation schemes: QPSK, 16QAM and 64QAM. The OFDM module conducts IFFT operation to transform 2k or 8k mode symbols into time domain symbols. The channel is modeled as a Rayleigh fading channel. At the receiver, the incoming complex data is transformed again to the frequency domain through the FFT operation, followed by inner and outer channel decoding as shown in FIG. 19. The system was simulated with a QPSK modulation scheme with 2048 FFT and ¾ punctured convolutional code.

Two of the largest memories in the system are targeted, the buffering and FFT memory after the ADC and the buffering memory after the FFT which is used for the channel equalization. As discussed above, memories before the FFT have a higher impact on the system overall BER. In previous work, a COFDM Baseband Receiver for DVB-T/H applications was implemented in 0.18 um technology. In this implementation, 158 Kbytes of embedded buffering memories were required for FFT processing, channel estimation and equalization. These memories occupy approximately around 35% of the chip area and consume 25% of the total chip power. The area and power consumption for both the memories and logic were scaled down to 65 nm as shown in Table III to quantify for process variation at advanced CMOM technology. Note that in other more advanced schemes such as LTE etc., the memory share of area and power are more pronounced due to buffering requirements of techniques such as HARQ and MIMO etc. It is also important to note that in such advanced systems, typically advanced modulation and coding are used (AMC), thus two loops will need to be jointly optimized. The slower outer AMC loop controls the slack seen by the receiver, and the faster inner loop of the power manager minimizes power based on available slack.

TABLE III

Area and Power Shares for Memory and Logic

|  | Count | Area | Power 0.18 um | Power 65 nm |
|---|---|---|---|---|
| Memory | 158K Bytes | 40.10% | 65.6225 mW | 7.067 mW |
| Logic | 317K Gates | 59.90% | 187.87 mW | 21.2 mW |

To verify the accuracy of the disclosed methodology, a full MATLAB simulation of the system depicted in FIG. 19 was performed, and the simulation BER was compared to that generated by the disclosed methodology. It is important to note that simulating the whole DVB system having only two faulty memories at different probability of failures will take several days depending on the simulation engine used, whereas using the equivalent noise model, the BER can be calculated in seconds.

Figure 20:
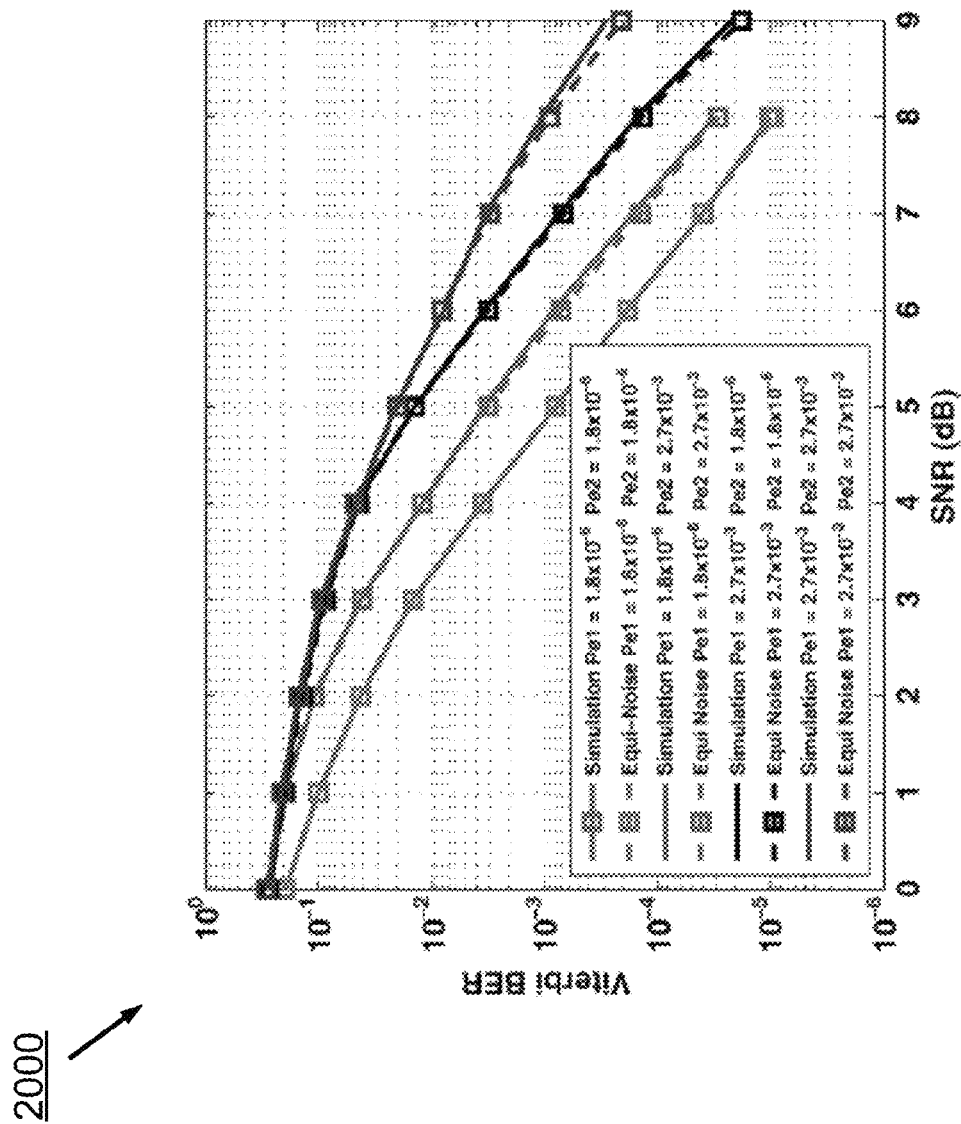
FIG. 20 is an illustration of a comparison between simulation and the present equivalent noise system BER performance for the DVB system of FIG. 19 with different values of memory error rates.

FIG. 20 is an illustration of a comparison 2000 between simulation and equivalent noise BER performance for the DVB system of FIG. 19 with different values of memory error rates. FIG. 20 shows the BER performance after the soft-input Viterbi for the DVB system obtained from both the simulation and the equivalent noise model. As shown, there is a close match between the simulation and the results using the proposed equivalent noise model. The difference between the results obtained by using the proposed method and simulation depends on error rates in both memories as discussed above. However, this mismatch can be alleviated. Since the BER of the equivalent noise is optimistic by a fractional of dB, by adding a correcting factor (back-off factor) equivalent to that mismatch to the estimated SNR, the equivalence can be achieved.

Figure 21:
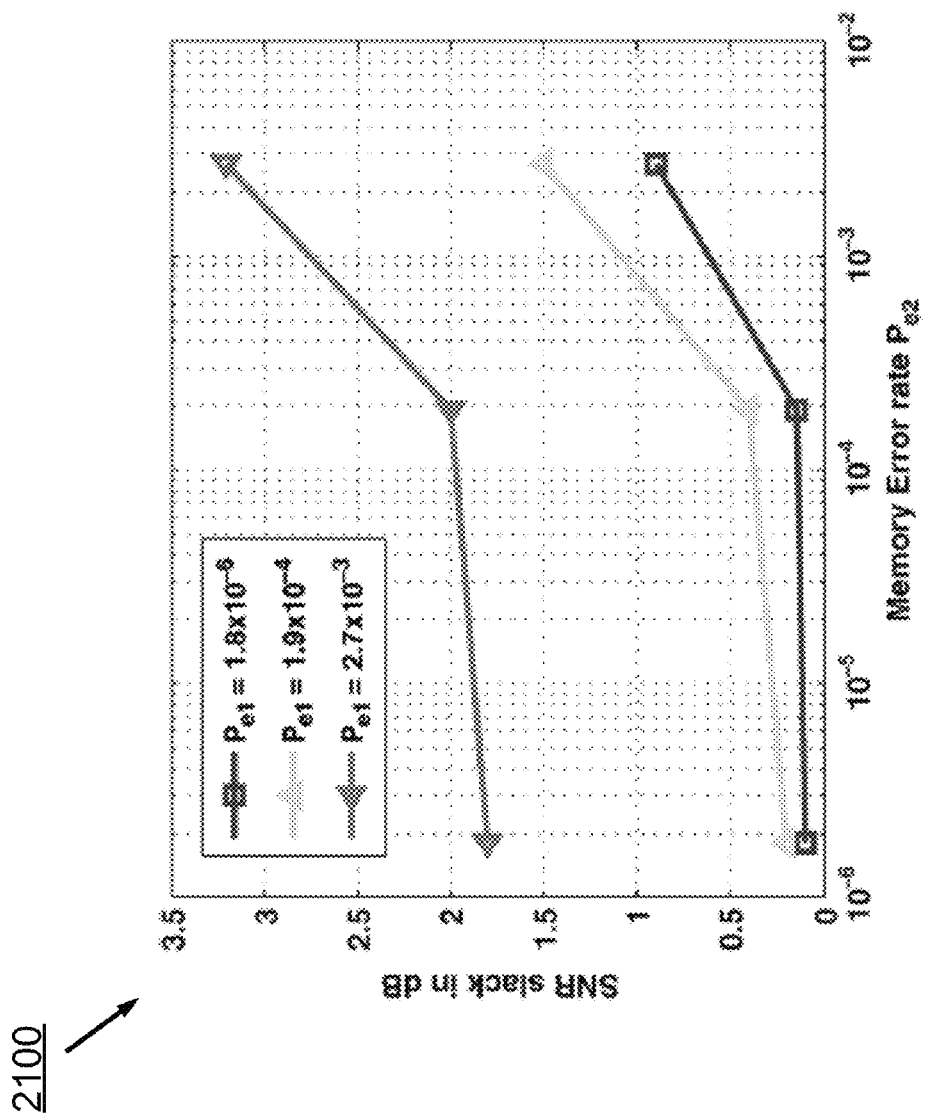
FIG. 21 is an illustration of required SNR slack to achieve $10^{-4}$ target BER for different combinations of memory error rates.

FIG. 21 (2100) is an illustration of required SNR slack to achieve $10^{-4}$ target BER for different combinations of memory error rates. Based on the equivalent noise model, FIG. 21 shows the required SNR slack for a target BER of with different error rates of the two large memories in the system. When both memories are operating at a low, the effective SNR is slightly less than the received SNR. That is why, a very small SNR slack is required to achieve the target BER. However as the memories error rates increase, the noise floor will increase accordingly. Hence a higher slack in the received SNR is required which depends on the location of each memory, the corresponding memory error rates and the sensitivity of the final BER to that specific memory. The corresponding power saving achieved via voltage over-scaling for each memory for the coded DVB is given in Table IV.

TABLE I

Memory Power Savings Versus Supply Voltage

| Power Savings % | $V_1 = 1.0$ | $V_1 = 0.85$ | $V_1 = 0.75$ | $V_1 = 0.65$ |
|---|---|---|---|---|
| $V_2 = 1.00$ | 0% | 16.68% | 28.82% | 39.4% |
| $V_2 = 0.85$ | 5.27% | 22.15% | 34.09% | 44.67% |
| $V_2 = 0.75$ | 9.101% | 25.78% | 37.92% | 48.50% |
| $V_2 = 0.65$ | 12.45% | 29.14% | 41.27% | 51.85% |

Figure 22:
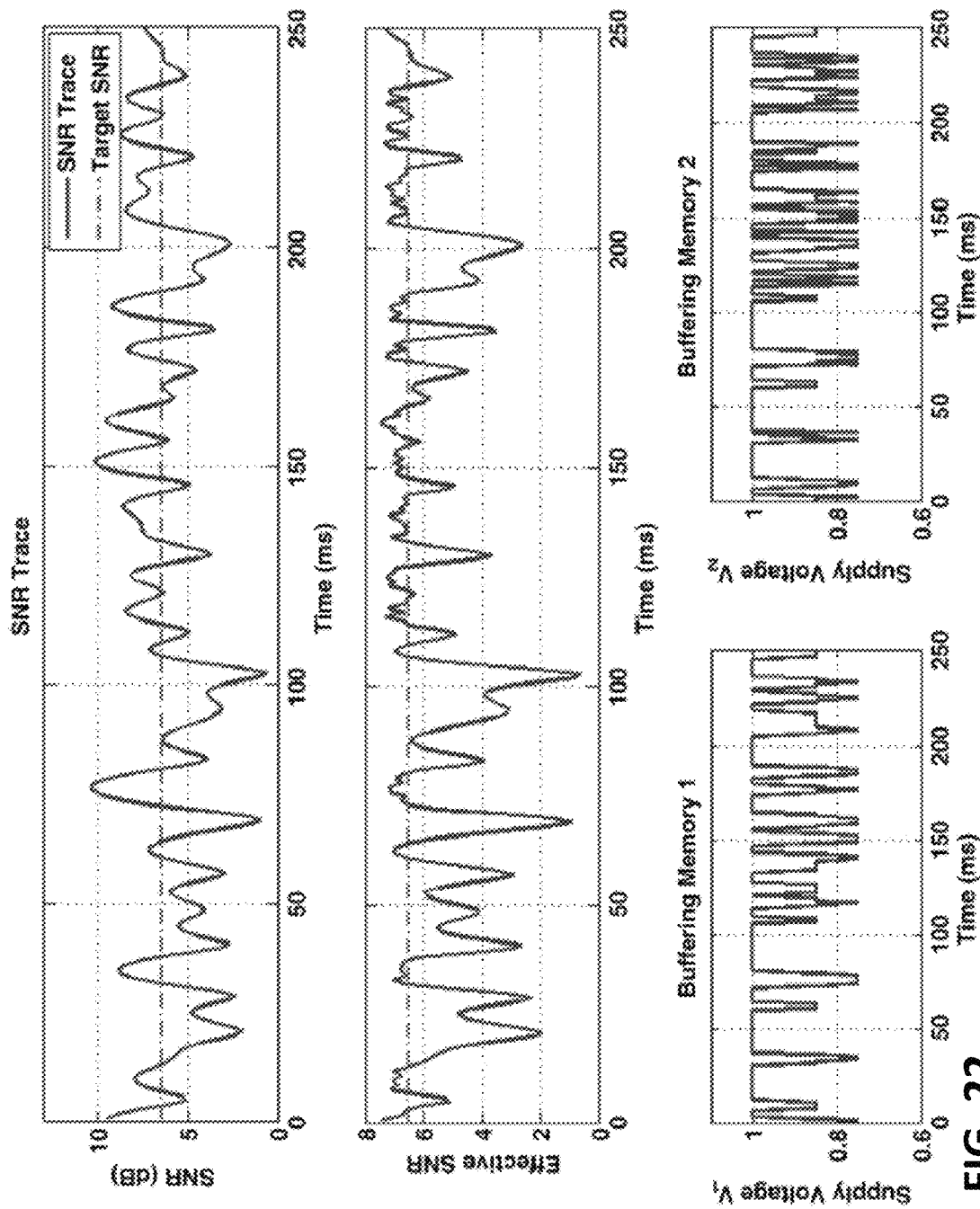
FIG. 22 is an illustration of an SNR trace, effective SNR, and the corresponding memory supply voltages for the DVB system of FIG. 19 based on the present equivalent noise framework.

FIG. 22 is an illustration 2200 of an SNR trace, effective SNR, and the corresponding memory supply voltages for the DVB system of FIG. 19 based on the equivalent noise framework. As the wireless channel changes, the quality of the received signal in terms of SNR, exhibits time varying behavior. The power manager keeps track of the average received SNR and exploits the available slack to reduce the supply voltage of the buffering memories as explained in Algorithm-1 and Algorithm-2. By employing the power manager in the DVB system to modulate the supply voltage of the buffering memories, the power savings depends on the available slack in the SNR.

FIG. 22 shows a sample of an SNR trace for a 5-tap Rayleigh fading channel with QPSK transmitted symbols for a target BER of after the Viterbi. The effective SNR along with the variation of the supply voltage for both memories versus time is shown in FIG. 20. It is clear that the more the slack in the SNR, the higher the savings are.

Figure 23:
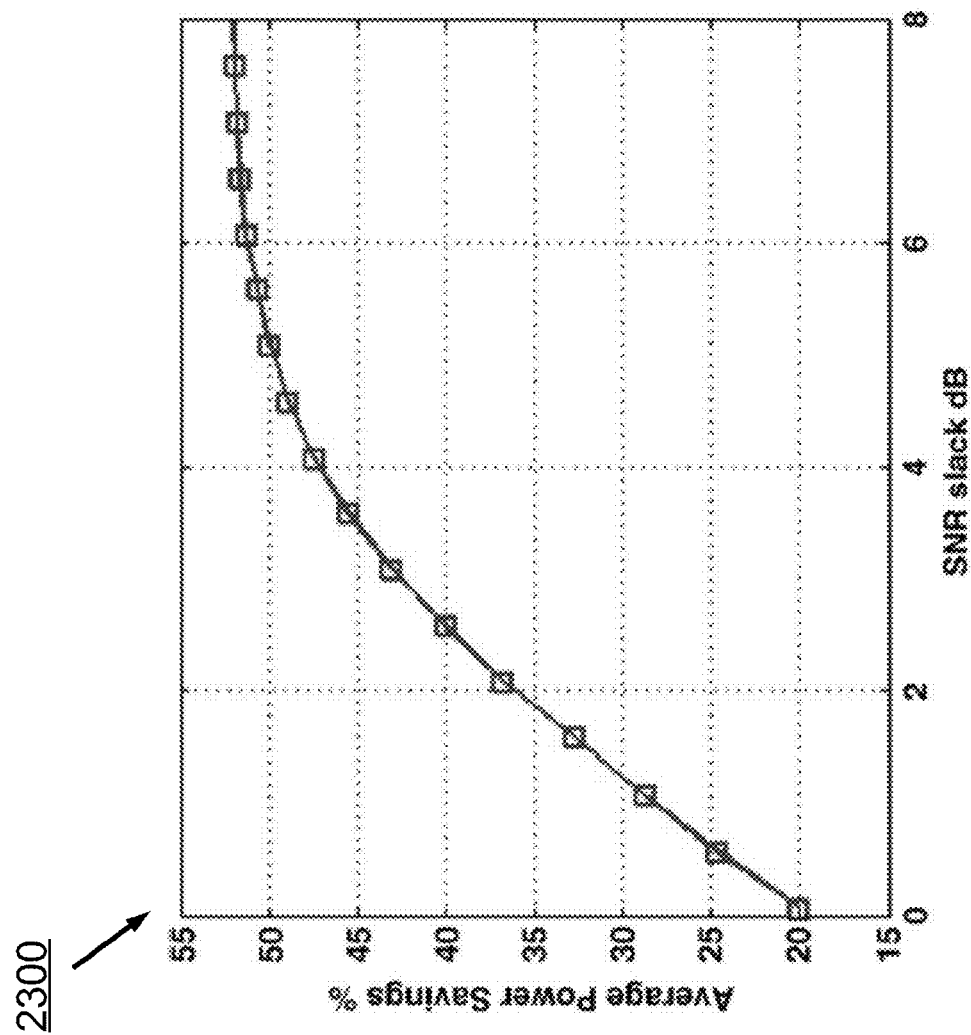
FIG. 23 is an illustration of average power savings of memories vs. SNR slack.

FIG. 23 (2300) is an illustration of average power savings of memories vs. SNR slack. FIG. 23 shows the total average power savings for both memories versus the average SNR slack.

Figure 24:
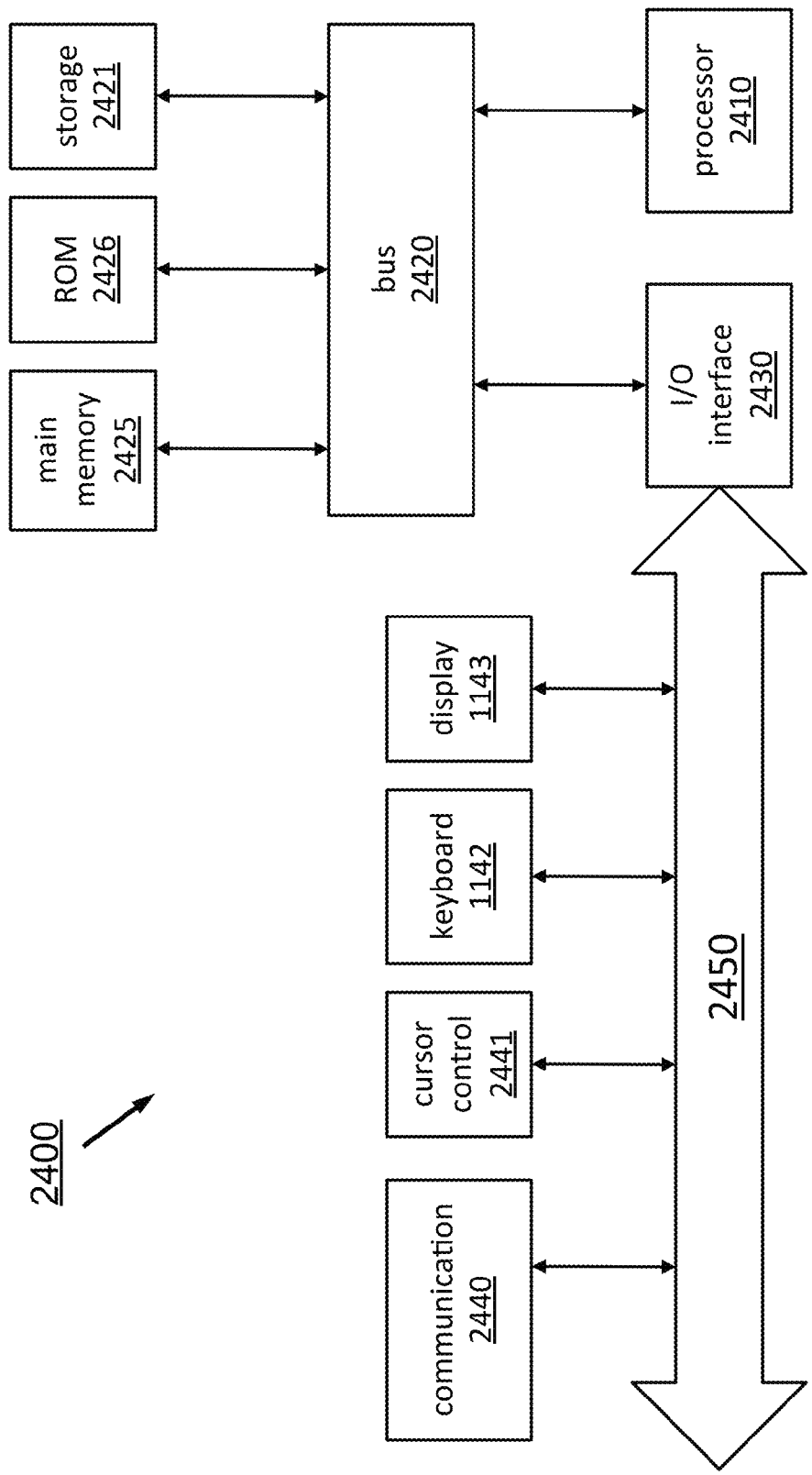
FIG. 24 illustrates an exemplary computer architecture that may be used for the present system, according to one embodiment.

FIG. 24 illustrates an exemplary computer architecture that may be used for the present system, according to one embodiment. One embodiment of architecture 2400 comprises a system bus 2420 for communicating information, and a processor 2410 coupled to bus 2420 for processing information. Architecture 2400 further comprises a random access memory (RAM) or other dynamic storage device 2425 (referred to herein as main memory), coupled to bus 2420 for storing information and instructions to be executed by processor 2410. Main memory 2425 also may be used for storing temporary variables or other intermediate information during execution of instructions by processor 2410. Architecture 2400 may also include a read only memory (ROM) and/or other static storage device 1126 coupled to bus 2420 for storing static information and instructions used by processor 2410.

A data storage device 2425 such as a magnetic disk or optical disc and its corresponding drive may also be coupled to architecture 2400 for storing information and instructions. Architecture 1100 can also be coupled to a second I/O bus 2450 via an I/O interface 2430. A plurality of I/O devices may be coupled to I/O bus 2450, including a display device 2443, an input device (e.g., an alphanumeric input device 2442 and/or a cursor control device 2441).

The communication device 2440 allows for access to other computers (e.g., servers or clients) via a network. The communication device 2440 may comprise one or more modems, network interface cards, wireless network interfaces or other interface devices, such as those used for coupling to Ethernet, token ring, or other types of networks.

The proposed model described herein enables system designers to rapidly and accurately design a more efficient power management policy as compared to the traditional power management policies such as DVFS. The embodiments disclosed herein enable a statistical model to accurately and rapidly evaluate the impact of memory failures due to voltage over-scaling as a means of power management. The effect on the data distribution at each block in the communication system leading to and originating from the memory in question is quantified in a closed form solution. By replacing the traditional noise model in communication systems with the developed equivalent noise model, one can investigate different power management policies, where the faulty hardware can be treated as error-free hardware. The accuracy of the model has been verified by performing a full simulation of a DVB system, which demonstrates that results from the simulation are in close agreement with those obtained by the proposed analytical methods.

A power management technique utilizing a method for accurately and rapidly estimating the change in the statistical distribution of data at each block in a communication system leading to or originating from a memory that is experiencing voltage scaling induced errors is disclosed. An appropriate memory supply voltage that maximizes power savings can be found by exploiting the available SNR slack while keeping the system performance within the required margin.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, the reader is to understand that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

REFERENCES

1. International Technology Roadmap for Semiconductors [Online] Available: http://www.itrs.net
2. B. H. Calhounand, A. P. Chandrakasan, "Ultra-dynamic voltage scaling (UDVS) using sub-threshold operation and local voltage dithering," IEEE J. Solid-State Circuits, vol. 41, no. 1, pp. 238-245, January 2006.
3. S. Mukhopadhyay, H. Mahmoodi, and K. Roy, "Statistical design and optimization of SRAM cell for yield enhancement," in Proc. IEEE/ACM Int. Conf. Computer Aided Design, November 2004, pp. 10-13.
4. S. Das, D. Roberts, L. Seokwoo, S. Pant, D. Blaauw, T. Austin, K. Flautner, and T. Mudge, "A self-tuning DVS processor using delay-error detection and correction," IEEE J. Solid-State Circuits, vol. 41, no. 4, pp. 792-804, April 2006.
5. F. J. Kurdahi, A. Eltawil, K. Yi, S. Cheng, and A. Khajeh, "Low-power multimedia system design by aggressive voltage scaling," IEEE Trans. Very Large Scale Integr. Syst., vol. 18, pp. 852-856, 2010.
6. G. Karakonstantis, C. Roth, C. Benkeser, and A. Burg, "On the exploitation of the inherent error resilience of wireless systems under un-reliable silicon," in Proc. 49th Annual Design Automation Conf., 2012, pp. 510-515, ACM.
7. C. Brehm, M. May, C. Gimmler, and N. Wehn, "A case study on error resilient architectures for wireless communication," in Architecture of Computing Systems. New York, N.Y., USA: Springer, 2012, pp. 13-24.
8. F. Kurdahi, A. Eltawil, A. K. Djahromi, M. Makhzan, and S. Cheng, "Error-aware design," in Proc. 10th Euromicro Conf. Digital System Design Architectures, Meth. Tools, Aug. 29-31, 2007, pp. 8-15.
9. Y. Liu, T. Zhang, and K. K. Parham, "Analysis of voltage over scaled computer arithmetic's in low power signal processing systems," in Proc. Asilomar Conf. Signals, Syst. Comput., Oct. 26-29, 2008, pp. 2093-2097.
   A. K. Djahromi, S. Cheng, A. M. Eltawil, and F. J. Kurdahi, "Power management for cognitive radio platforms," in IEEE Global Telecommun. Conf., Nov. 26-30, 2007, pp. 4066-4070.

10. Digital Video Broadcasting (DVB): Frame Structure, Channel Coding and Modulation for Digital Terrestrial Television (DVB-T) ETSI, 2004, Tech. Rep. ETSI EN 300 744.
11. C. Chi-Chie, S. Chi-Hong, and W. Jen-Ming, "A low power baseband OFDM receiver IC for fixed WiMAX communication," in Proc. IEEE Asian Solid-State Circuits Conf., Nov. 12-14, 2007, pp. 292-295.
12. C. Lei-Fone, C. Yuan, C. Lu-Chung, M. Ying-Hao, L. Chia-Hao, L. Yu-Wei, L. Chien-Ching, L. Hsuan-Yu, H. Terng-Yin, and L. Chen-Yi, "A 1.8 V 250 mW COFDM baseband receiver for DVB-T/H applications," in Proc. IEEE Int. Solid-State Circuits Conf., Feb. 6-9, 2006, pp. 1002-1011.
13. IEEE Standard for Local and Metropolitan Area Networks Part 16: Air Interface for Fixed Broadband Wireless Access Systems, IEEE 802.16, 2004.
    A. Nilsson, E. Tell, and D. Liu, "An 11 mm², 70 mW fully programmable baseband processor for mobile WiMAX and DVB-T/H in 0.12 um CMOS," IEEE J. Solid-State Circuits, vol. 44, no. 1, pp. 90-97, January 2009.
A. B. Ericsson, Long term evolution (LTE): An introduction White Paper, October 2007.
14. R. Hegdeand, N. R. Shanghai, "A voltage overscaled low-power digital filter IC," IEEE J. Solid-State Circuits, vol. 39, no. 2, pp. 388-391, February 2004.
    A. K. Djahromi, A. M. Eltawil, and F. J. Kurdahi, "Fault tolerant approaches targeting ultra low power communications system de-sign," in Proc. IEEE Vehicular Technol. Conf., Apr. 22-25, 2007, pp. 2600-2604.
A. Khajeh, K. Amir, M. S. Khairy, A. M. Eltawil, and F. J. Kurdahi, "A unified hardware and channel noise model for communication systems," in Proc. IEEE Global Telecommun. Conf., Dec. 6-10, 2010, pp. 1-5.
15. M. S. Khairy, A. Khajeh, A. M. Eltawil, and F. J. Kurdahi, "FFT processing through faulty memories in OFDM based systems," in Proc. IEEE GLOBECOM Workshops Appl. Commun. Theory Emerging Memory Technol., Dec. 6-10, 2010, pp. 1946-1951.
B. Roth, C. Benkeser, C. Studer, G. Karakonstantis, and A. Burg, Data Mapping for Unreliable Memories arXiv preprint arXiv:1212.4950, 2012.
16. A. K. Djahromi, A. M. Eltawil, F. J. Kurdahi, and R. Kanj, "Crosslayer error exploitation for aggressive voltage scaling," in Proc. Int. Symp. Quality Electronic Design, Mar. 26-28, 2007, pp. 192-197.
17. S. Mukhopadhyay, H. Mahmoodi, and K. Roy, "Modeling of failure probability and statistical design of SRAM array for yield enhancement in nanoscaled CMOS," IEEE Trans. Computer-Aided Des. Integr. Circuits Syst., vol. 24, no. 12, pp. 1859-1880, December 2005.
    A. Khajeh, A. M. Eltawil, and F. J. Kurdahi, "Embedded memories fault-tolerant pre and post silicon optimization," IEEE Trans. Very Large Scale Integr. Syst., vol. 19, no. 10, pp. 1916-1921, October 2011.
A. Papulis, Probability, Random Variables and Stochastic Processes. New York, N.Y., USA: McGraw-Hill, 1965.
18. J. Brown and H. Piper, "Output characteristic function for an analog crosscorrelator with band pass inputs," IEEE Trans. Inf. Theory, pp. 6-10, January 1967.
19. J. Schoukens and J. Renneboog, "Modeling the noise influence on the Fourier coefficients after a discrete Fourier transform," IEEE Trans. Instrum. Meas., vol. IM-35, pp. 278-286, 1986.
    A. Hussien, M. S. Khairy, A. Khajeh, A. M. Eltawil, and F. J. Kurdahi, "Combined channel and hardware noise resilient viterbi decoder," in Proc. Asilomar Conf. Signals, Systems, Comput., pp. 395-399, 7-10 November
    A. M. A. Hussien, M. S. Khairy, A. Khajeh, A. M. Eltawil, and F. J. Kurdahi, "A class of low power error compensation iterative decoders," in Proc. IEEE Global Telecommun. Conf., Dec. 5-9, 2011, pp. 1-6.
20. J. Geldmacher and J. Gotze, "On fault tolerant decoding of Turbo codes," in Proc. 7th Int. Symp. Turbo Codes and Iterative Information Processing (ISTC), August 2012, pp. 245-249.
21. Predictive Technology Model (PTM) [Online]. Available: http://www.eas.asu.edu/~ptm

What is claimed is:

1. A method to achieve a target bit error rate for a communications system, comprising:
    estimating channel parameters of a channel used by the communications system, wherein the channel parameters include a channel power and a channel noise variance;
    calculating an average received signal to noise ratio for the communications system based on the channel parameters;
    obtaining a target signal to noise ratio for the communications system based on the target bit error rate;
    iterating through a plurality of supply voltages for a memory device of the communications system and a corresponding plurality of effective signal to noise ratios for the communications system, wherein each of the effective signal to noise ratios is characterized based on a memory error rate of the memory device at one of the plurality of supply voltages and the average received signal to noise ratio; and
    selecting one of the plurality of supply voltages to supply power to the memory device based on the plurality of effective signal to noise ratios and a difference between the average received signal to noise ratio and the target signal to noise ratio, the one of the plurality of supply voltages being selected for power savings while achieving the target bit error rate for the communications system.

2. The method of claim 1, further comprising determining the plurality of effective signal to noise ratios by:
    reading a bit error rate of the memory device for each of the plurality of supply voltages;
    based on a derived probability mass functions distribution, calculating an equivalent noise model that achieves a same bit error rate under each of the plurality of supply voltages; and
    tabulating an effective signal to noise ratio value for each equivalent noise model.

3. The method of claim 1, wherein:
    the communications system comprises a wireless communications system; and
    the memory device is a buffering memory in the wireless communication system.

4. The method of claim 3, wherein the buffering memory is in a receiver front end of the wireless communications system.

5. The method of claim 3, wherein the buffering memory is used for storing one of data before a Fast Fourier Transform (FFT) block, data after the FFT block, data before channel estimation, data after channel estimation, data before an interleaver block, data after an interleaver block, data before equalization, or data after equalization.

6. The method of claim 3, wherein the communication system is an orthogonal frequency division multiplexing (OFDM) based communication system.

7. The method of claim 6, wherein the channel used by the communication system comprises additive white Gaussian noise (AWGN).

8. The method of claim 1, wherein the one of the plurality of supply voltages is selected dynamically over time.

9. The method of claim 1, wherein the plurality of supply voltages for the memory device of the communications system and the corresponding plurality of effective signal to noise ratios are stored in a look up table for reference by the communications system.

10. The method of claim 1, further comprising calculating an available signal to noise ratio slack as the difference between the average received signal to noise ratio and the target signal to noise ratio.

11. A method to achieve a target bit error rate for a communication system, comprising:
  estimating at least one channel parameter of a channel used by the communications system;
  calculating an average received signal to noise ratio for the communications system based on the at least one channel parameter;
  calculating an available signal to noise ratio slack for the communications system based on a difference between the average received signal to noise ratio and a target signal to noise ratio;
  iterating through a plurality of supply voltages for a memory device of the communications system and a corresponding plurality of effective signal to noise ratios for the communications system, wherein each of the effective signal to noise ratios is characterized based on a memory error rate of the memory device at one of the plurality of supply voltages and the average received signal to noise ratio; and
  selecting one of the plurality of supply voltages to supply power to the memory device based on the plurality of effective signal to noise ratios and a difference between the average received signal to noise ratio and a target signal to noise ratio, the one of the plurality of supply voltages being selected for power savings while achieving the target bit error rate for the communications system.

12. The method of claim 11, further comprising determining the plurality of effective signal to noise ratios by:
  reading a bit error rate of the memory device for each of the plurality of supply voltages;
  based on a derived probability mass functions distribution, calculating an equivalent noise model that achieves a same bit error rate under each of the plurality of supply voltages; and
  tabulating an effective signal to noise ratio value for each equivalent noise model.

13. The method of claim 11, wherein the one of the plurality of supply voltages is selected dynamically over time.

14. A method of dynamically selecting a supply voltage for a memory device of a communications system to achieve a target bit error rate (BER), comprising:
  calculating a signal to noise ratio for communications over a channel used by the communications system;
  calculating an available signal to noise ratio slack for the communications system based on a difference between the signal to noise ratio and a target signal to noise ratio;
  iterating through a plurality of supply voltages for a memory device of the communications system and a corresponding plurality of effective signal to noise ratios for the communications system, wherein each of the effective signal to noise ratios is characterized based on a memory error rate of the memory device at one of the plurality of supply voltages and the signal to noise ratio; and
  selecting one of the plurality of supply voltages to supply power to the memory device based on the plurality of effective signal to noise ratios and the available signal to noise ratio slack, the one of the plurality of supply voltages being selected for power savings while achieving the target bit error rate for the communications system.

15. The method of claim 14, further comprising determining the plurality of effective signal to noise ratios by:
  reading a bit error rate of the memory device for each of the plurality of supply voltages;
  based on a derived probability mass functions distribution, calculating an equivalent noise model that achieves a same bit error rate under each of the plurality of supply voltages; and
  tabulating an effective signal to noise ratio value for each equivalent noise model.

16. The method of claim 14, wherein:
  the communications system comprises a wireless communications system; and
  the memory device is a buffering memory in the wireless communication system.

17. The method of claim 16, wherein the buffering memory is in a receiver front end of the wireless communications system preceding analog to digital conversion.

18. The method of claim 16, wherein the buffering memory is used for storing one of data before a Fast Fourier Transform (FFT) block, data after the FFT block, data before channel estimation, data after channel estimation, data before an interleaver block, data after an interleaver block, data before equalization, or data after equalization.

19. The method of claim 14, wherein the communication system is an orthogonal frequency division multiplexing (OFDM) based communication system.

20. The method of claim 19, wherein the channel used by the communication system comprises additive white Gaussian noise (AWGN).

21. The method of claim 14, wherein the one of the plurality of supply voltages is selected dynamically over time.

* * * * *